US011608181B2

(12) United States Patent
Leidich et al.

(10) Patent No.: US 11,608,181 B2
(45) Date of Patent: Mar. 21, 2023

(54) RIGIDIZED ASSISTED OPENING SYSTEM FOR HIGH ALTITUDE PARAFOILS

(71) Applicant: World View Enterprises Inc., Tucson, AZ (US)

(72) Inventors: Jared Leidich, Denver, CO (US); Taber Kyle MacCallum, Tucson, AZ (US); Ty Bowen, Tucson, AZ (US)

(73) Assignee: World View Enterprises Inc., Tucson, AZ (US)

( * ) Notice: Subject to any disclaimer, the term of this patent is extended or adjusted under 35 U.S.C. 154(b) by 284 days.

(21) Appl. No.: 16/997,786

(22) Filed: Aug. 19, 2020

(65) Prior Publication Data

US 2021/0070456 A1 Mar. 11, 2021

Related U.S. Application Data

(63) Continuation of application No. 15/065,828, filed on Mar. 9, 2016, now Pat. No. 10,787,268.
(Continued)

(51) Int. Cl.
*B64D 17/76* (2006.01)
*B64D 17/62* (2006.01)
(Continued)

(52) U.S. Cl.
CPC .............. *B64D 17/76* (2013.01); *B64B 1/40* (2013.01); *B64D 1/12* (2013.01); *B64D 17/025* (2013.01);
(Continued)

(58) Field of Classification Search
CPC ...... B64D 17/02; B64D 17/025; B64D 17/80; B64D 17/62; B64D 17/72; B64D 17/18;
(Continued)

(56) References Cited

U.S. PATENT DOCUMENTS

| 1,012,559 A | 12/1911 | Kalaba |
| 1,056,503 A | 3/1913 | Cooper |

(Continued)

FOREIGN PATENT DOCUMENTS

| CN | 2844003 | 12/2006 |
| CN | 200988579 | 12/2007 |

(Continued)

OTHER PUBLICATIONS

"Homepage", World View Website, http://worldview.space, May 8, 2015, 1 page.
(Continued)

*Primary Examiner* — Philip J Bonzell
(74) *Attorney, Agent, or Firm* — Knobbe, Martens, Olson & Bear, LLP

(57) ABSTRACT

A parafoil for operation at high altitudes, in low density air, or at low airspeeds, and methods for opening same. Some versions of the parafoil comprise flexible members connected to the parafoil canopy. When the parafoil canopy is in a stowed configuration, the members are deformed, storing elastic energy. When the canopy is released from its stowed configuration, the members spring back to their undeformed shapes, thereby opening or assisting with opening the canopy. The flexible member may also be attached to a base structure, which is attached to the payload. The members may comprise rods or hollow tubes that can be flexed using a fulcrum near the base structure, or a spacer plate, so that the ends connected to the canopy are restrained by a parachute bag containing the stowed or packed canopy. The parachute bag can be opened prior to or during detachment of the parafoil from the flight vehicle.

17 Claims, 19 Drawing Sheets

Related U.S. Application Data

(60) Provisional application No. 62/239,154, filed on Oct. 8, 2015, provisional application No. 62/130,395, filed on Mar. 9, 2015.

(51) Int. Cl.
  B64D 17/02 (2006.01)
  B64D 17/24 (2006.01)
  B64B 1/40 (2006.01)
  B64D 1/12 (2006.01)
  B64D 17/26 (2006.01)
  B64D 17/40 (2006.01)
  B64D 17/72 (2006.01)
  B64D 17/70 (2006.01)

(52) U.S. Cl.
  CPC ............ *B64D 17/24* (2013.01); *B64D 17/26* (2013.01); *B64D 17/40* (2013.01); *B64D 17/62* (2013.01); *B64D 17/72* (2013.01); *B64D 17/70* (2013.01)

(58) Field of Classification Search
  CPC .......... B64D 17/76; B64D 17/70; B64D 1/12; B64C 31/036; B64C 31/028
  See application file for complete search history.

(56) References Cited

U.S. PATENT DOCUMENTS

| | | |
|---|---|---|
| 1,091,895 A | 3/1914 | Schaaf |
| 1,093,311 A | 4/1914 | Chaumeret |
| 1,108,484 A | 8/1914 | Banic |
| 1,178,864 A | 4/1916 | Loson |
| 1,277,892 A | 9/1918 | Evans |
| 1,299,123 A | 4/1919 | Calthrop |
| 1,303,474 A | 5/1919 | Hall |
| 1,308,033 A | 7/1919 | Benton |
| 1,314,446 A | 8/1919 | Webb, Sr. |
| 1,329,359 A | 2/1920 | Berg |
| 1,477,338 A | 12/1923 | Finley |
| 1,646,586 A | 10/1927 | Loth |
| 1,656,780 A | 1/1928 | Diago |
| 1,682,509 A | 8/1928 | Harwick |
| 1,705,854 A | 3/1929 | Coughlin |
| 1,826,245 A | 10/1931 | Hammerle |
| 1,829,561 A * | 10/1931 | Knight .............. B64D 1/02 244/149 |
| 2,008,107 A | 7/1935 | Norden |
| 2,083,743 A | 6/1937 | Poole |
| 2,708,082 A | 5/1955 | Moore et al. |
| 2,740,598 A | 4/1956 | Van Krevelen |
| 2,756,948 A | 7/1956 | Winzen et al. |
| 2,771,256 A | 11/1956 | Ryan |
| 2,865,581 A | 12/1958 | Froehlich |
| 2,929,065 A | 3/1960 | Kreinheder |
| 2,949,263 A | 8/1960 | Steinthal |
| 2,950,881 A | 8/1960 | Schwoebel |
| 2,954,187 A | 9/1960 | Winzen |
| 2,977,069 A | 3/1961 | Huch et al. |
| 3,015,456 A | 1/1962 | Deisinger |
| 3,045,952 A | 7/1962 | Underwood |
| 3,073,040 A | 1/1963 | Schueller |
| 3,077,779 A | 2/1963 | Froehlich et al. |
| 3,087,696 A | 4/1963 | Sepp, Jr. |
| 3,093,346 A | 6/1963 | Faget et al. |
| 3,098,630 A | 7/1963 | Conners |
| 3,135,163 A | 6/1964 | Mechlin, Jr. et al. |
| 3,141,640 A | 7/1964 | Sutliff et al. |
| 3,142,063 A | 7/1964 | Goetzmann, Jr. |
| 3,146,500 A | 9/1964 | Volkert |
| 3,195,834 A | 7/1965 | Huch et al. |
| 3,260,480 A | 7/1966 | Ash et al. |
| 3,270,908 A | 9/1966 | Faget et al. |
| 3,278,142 A | 10/1966 | Marshall |
| 3,312,427 A | 4/1967 | Yost |
| 3,424,405 A | 1/1969 | Struble, Jr. |
| 3,432,122 A | 3/1969 | Flickinger et al. |
| 3,434,680 A | 3/1969 | Ferguson |
| 3,446,458 A | 5/1969 | Rogallo |
| 3,465,482 A | 9/1969 | Chandler |
| 3,558,083 A | 1/1971 | Conley et al. |
| 3,606,212 A | 9/1971 | Paine |
| 3,698,281 A | 10/1972 | Brandt et al. |
| 3,778,010 A | 12/1973 | Potts et al. |
| 3,814,353 A | 6/1974 | Nelson |
| 3,906,970 A | 9/1975 | Saito et al. |
| 4,105,173 A | 8/1978 | Bucker |
| 4,113,206 A | 9/1978 | Wheeler |
| 4,134,227 A | 1/1979 | Kupperman et al. |
| 4,204,213 A | 5/1980 | Wheeler et al. |
| 4,215,834 A | 8/1980 | Dunlap |
| 4,361,295 A | 11/1982 | Wenzel |
| RE31,205 E | 4/1983 | Jalbert |
| 4,424,945 A | 1/1984 | Dell |
| 4,529,153 A | 7/1985 | Conn |
| 4,581,897 A | 4/1986 | Sankrithi |
| 4,586,456 A | 5/1986 | Forward |
| 4,601,443 A | 7/1986 | Jones et al. |
| 4,657,207 A | 4/1987 | Poling |
| 4,664,343 A | 5/1987 | Lofts et al. |
| 4,711,416 A | 12/1987 | Regipa |
| 4,828,207 A | 5/1989 | Haynes |
| 4,865,274 A | 9/1989 | Fisher |
| 4,889,394 A | 12/1989 | Ruspa |
| 4,936,528 A | 6/1990 | Butner et al. |
| 5,028,018 A | 7/1991 | Krebber |
| 5,111,213 A | 5/1992 | Jahoda et al. |
| 5,149,015 A | 9/1992 | Davis |
| 5,217,186 A | 6/1993 | Stewart et al. |
| 5,232,184 A | 8/1993 | Reuter |
| 5,244,169 A | 9/1993 | Brown et al. |
| 5,251,850 A | 10/1993 | Noren |
| 5,274,976 A | 1/1994 | Burkhart |
| 5,327,904 A | 7/1994 | Hannum |
| 5,333,817 A | 8/1994 | Kalisz et al. |
| 5,362,017 A | 11/1994 | Puckett |
| 5,511,748 A | 4/1996 | Scott |
| 5,620,153 A | 4/1997 | Ginsberg |
| 5,718,399 A | 2/1998 | Cheng |
| 5,884,981 A | 3/1999 | Ichikawa |
| 5,893,536 A | 4/1999 | Lee et al. |
| 6,116,538 A | 9/2000 | Häfelfinger |
| 6,220,547 B1 * | 4/2001 | Smith .................. B64D 17/025 244/152 |
| 6,234,425 B1 | 5/2001 | Rand et al. |
| 6,237,241 B1 | 5/2001 | Aaron et al. |
| 6,250,227 B1 | 6/2001 | Salort |
| 6,290,172 B1 | 9/2001 | Yajima et al. |
| 6,360,988 B1 | 3/2002 | Monroe |
| 6,364,251 B1 | 4/2002 | Yim |
| 6,425,640 B1 | 7/2002 | Hussaini |
| 6,499,697 B1 | 12/2002 | Patel et al. |
| 6,527,223 B1 | 3/2003 | Mondale |
| 6,565,042 B1 | 5/2003 | Yamada |
| 6,581,873 B2 | 6/2003 | McDermott |
| 6,596,370 B2 | 7/2003 | Hyuga et al. |
| 6,604,333 B1 | 8/2003 | Schiedeggr et al. |
| 6,609,680 B2 | 8/2003 | Perry et al. |
| 6,626,400 B1 | 9/2003 | Booth |
| 6,648,272 B1 | 11/2003 | Kothman |
| 6,672,676 B2 | 1/2004 | Zaniboni |
| 6,705,572 B1 | 3/2004 | Christopher |
| 6,791,510 B2 | 9/2004 | Watanabe et al. |
| 6,799,810 B1 | 10/2004 | Wang |
| 6,805,319 B2 | 10/2004 | Senepart |
| 6,883,756 B2 | 4/2005 | Preston |
| 6,889,942 B2 | 5/2005 | Preston |
| 6,926,369 B2 | 8/2005 | McCaster, III et al. |
| 6,983,910 B2 | 1/2006 | Yajima et al. |
| 7,055,777 B2 | 6/2006 | Colting |
| 7,156,342 B2 | 1/2007 | Heaven, Jr. et al. |
| 7,168,922 B2 | 1/2007 | Stagg et al. |
| 7,182,295 B2 | 2/2007 | Redmond |

(56) References Cited

U.S. PATENT DOCUMENTS

| | | |
|---|---|---|
| 7,287,725 B2 | 10/2007 | Chasman et al. |
| D557,817 S | 12/2007 | Verfuerth |
| 7,313,362 B1 | 12/2007 | Sainct |
| D575,410 S | 8/2008 | Best |
| 7,416,158 B2 | 8/2008 | Sadeck |
| 7,469,857 B2 | 12/2008 | Voss |
| 7,530,527 B2 | 5/2009 | Kelleher |
| 7,556,040 B2 | 7/2009 | Meyer et al. |
| 7,584,928 B2 | 9/2009 | Hoffman |
| 7,775,604 B2 | 8/2010 | Chen |
| D632,804 S | 2/2011 | Afasano |
| 8,061,648 B2 | 11/2011 | Lachenmeier |
| 8,091,826 B2 | 1/2012 | Voorhees |
| 8,100,367 B1 | 1/2012 | Rousseau |
| 8,104,718 B2 | 1/2012 | Shaw |
| 8,116,763 B1 | 2/2012 | Olsen |
| 8,118,262 B2 | 2/2012 | Jameson |
| 8,158,236 B2 | 4/2012 | Liggett et al. |
| 8,167,240 B2 | 5/2012 | Greiner |
| 8,220,751 B1 | 7/2012 | Berland |
| 8,267,348 B2 | 9/2012 | Alavi |
| 8,286,907 B2 | 10/2012 | Dohi et al. |
| 8,286,910 B2 | 10/2012 | Alavi |
| 8,376,279 B2 | 2/2013 | Parks et al. |
| 8,387,501 B2 | 3/2013 | Jordan et al. |
| 8,403,268 B2 | 3/2013 | Suze et al. |
| 8,448,898 B1 | 5/2013 | Frolov et al. |
| 8,485,465 B2 | 7/2013 | Lee |
| 8,505,847 B2 | 8/2013 | Ciampa et al. |
| 8,544,797 B2 | 10/2013 | Kramer |
| 8,590,830 B2 | 11/2013 | Izutsu et al. |
| 8,622,338 B2 | 1/2014 | Ciampa et al. |
| 8,640,993 B2 | 2/2014 | Culbreath |
| 8,668,161 B2 | 3/2014 | Heppe |
| 8,678,309 B2 | 3/2014 | Heppe |
| 8,718,477 B2 | 5/2014 | DeVaul et al. |
| 8,777,156 B2 | 7/2014 | Piini et al. |
| 8,781,727 B1 | 7/2014 | Bonawitz et al. |
| 8,804,228 B1 | 8/2014 | Biffle et al. |
| 8,812,176 B1 | 8/2014 | Biffle et al. |
| 8,814,084 B2 | 8/2014 | Shenhar |
| 8,820,678 B2 | 9/2014 | DeVaul et al. |
| 8,833,696 B1 | 9/2014 | Teller et al. |
| 8,849,571 B1 | 9/2014 | Bonawitz et al. |
| 8,862,403 B1 | 10/2014 | Piponi et al. |
| 8,864,242 B2 | 10/2014 | Mengle et al. |
| 8,874,356 B1 | 10/2014 | Bonawitz |
| 8,880,326 B1 | 11/2014 | Bonawitz et al. |
| 8,897,933 B1 | 11/2014 | Teller et al. |
| 8,910,905 B2 | 12/2014 | DeVaul et al. |
| 8,917,995 B1 | 12/2014 | Biffle et al. |
| 8,918,047 B1 | 12/2014 | Teller et al. |
| 8,948,927 B1 | 2/2015 | Piponi |
| 8,971,274 B1 | 3/2015 | Teller et al. |
| 8,988,253 B2 | 3/2015 | Teller et al. |
| 8,996,024 B1 | 3/2015 | Teller et al. |
| 8,998,128 B2 | 4/2015 | Ratner |
| 9,010,691 B1 | 4/2015 | Ratner et al. |
| 9,016,634 B1 | 4/2015 | Ratner et al. |
| 9,027,874 B1 | 5/2015 | Roach et al. |
| 9,033,274 B2 | 5/2015 | DeVaul et al. |
| 9,033,281 B1 | 5/2015 | Adams |
| 9,038,963 B2 | 5/2015 | Gratzer |
| 9,045,213 B1 | 6/2015 | DeVaul |
| 9,067,666 B1 | 6/2015 | Roach et al. |
| 9,085,348 B1 | 7/2015 | Roach et al. |
| 9,090,323 B1 | 7/2015 | Ratner |
| 9,093,754 B2 | 7/2015 | Behroozi et al. |
| 9,096,301 B1 | 8/2015 | Biffle et al. |
| 9,096,302 B2 | 8/2015 | Zhang et al. |
| 9,097,361 B1 | 8/2015 | Ratner |
| 9,106,336 B1 | 8/2015 | Brouillet |
| 9,114,866 B1 | 8/2015 | Roach |
| 9,120,551 B1 | 9/2015 | Ratner |
| 9,139,278 B1 | 9/2015 | Roach et al. |
| 9,139,279 B2 | 9/2015 | Heppe |
| 9,148,215 B1 | 9/2015 | Bonawitz |
| 9,153,854 B1 | 10/2015 | Biffle et al. |
| 9,174,718 B1 | 11/2015 | Roach et al. |
| 9,174,720 B1 | 11/2015 | Ratner |
| 9,174,738 B1 | 11/2015 | Roach et al. |
| 9,180,981 B2 | 11/2015 | Lopez Urdiales |
| 9,193,480 B2 | 11/2015 | Smith et al. |
| 9,195,938 B1 | 11/2015 | Bonawitz et al. |
| 9,201,426 B1 | 12/2015 | Bonawitz |
| 9,203,148 B1 | 12/2015 | Teller et al. |
| 9,205,701 B2 | 12/2015 | Morse et al. |
| 9,211,942 B1 | 12/2015 | Roach |
| 9,221,531 B1 | 12/2015 | Brookes |
| 9,233,746 B2 | 1/2016 | DeVaul et al. |
| 9,242,712 B1 | 1/2016 | Ratner |
| 9,254,906 B1 | 2/2016 | Behroozi et al. |
| 9,266,598 B1 | 2/2016 | DeVaul |
| 9,275,551 B2 | 3/2016 | Bonawitz et al. |
| 9,281,554 B1 | 3/2016 | Behroozi et al. |
| 9,281,896 B2 | 3/2016 | Teller et al. |
| 9,285,450 B2 | 3/2016 | DeVaul et al. |
| 9,290,258 B1 | 3/2016 | DeVaul |
| 9,296,461 B1 | 3/2016 | Roach |
| 9,296,462 B1 | 3/2016 | Brookes et al. |
| 9,300,388 B1 | 3/2016 | Behroozi et al. |
| 9,306,271 B1 | 4/2016 | Biffle et al. |
| 9,306,668 B2 | 4/2016 | DeVaul et al. |
| 9,318,789 B1 | 4/2016 | Henrich et al. |
| 9,321,517 B1 | 4/2016 | DeVaul |
| 9,325,058 B2 | 4/2016 | Le |
| 9,327,816 B1 | 5/2016 | Mathe et al. |
| 9,327,817 B1 | 5/2016 | Roach |
| 9,327,818 B1 | 5/2016 | Roach |
| 9,327,844 B2 | 5/2016 | Ratner |
| 9,329,600 B2 | 5/2016 | DeVaul et al. |
| 9,340,272 B1 | 5/2016 | DeVaul et al. |
| 9,346,531 B1 | 5/2016 | Washburn et al. |
| 9,346,532 B1 | 5/2016 | Ratner |
| 9,424,752 B1 | 8/2016 | Bonawitz |
| 9,457,886 B2 | 10/2016 | Hazen |
| 9,463,861 B2 | 10/2016 | Smith et al. |
| 9,463,863 B1 | 10/2016 | Roach et al. |
| 9,520,940 B2 | 12/2016 | Teller |
| 9,532,174 B2 | 12/2016 | Teller |
| 9,540,091 B1 | 1/2017 | MacCallum et al. |
| 9,561,858 B2 | 2/2017 | Leidich et al. |
| 9,584,214 B2 | 2/2017 | Teller et al. |
| 9,658,618 B1 | 5/2017 | Knoblach et al. |
| 9,669,918 B1 | 6/2017 | Fourie et al. |
| 9,694,910 B2 | 7/2017 | MacCallum et al. |
| 9,826,407 B2 | 11/2017 | Teller et al. |
| 9,829,561 B2 | 11/2017 | Bonawitz et al. |
| 9,834,297 B2 | 12/2017 | Brookes |
| 9,845,140 B2 | 12/2017 | Crites |
| 9,868,537 B2 | 1/2018 | Leidich et al. |
| 9,908,609 B1 | 3/2018 | Fourie |
| 9,925,718 B2 | 3/2018 | Roach et al. |
| 10,124,875 B1 | 11/2018 | Farley et al. |
| 10,144,496 B2 | 12/2018 | Smith et al. |
| 10,162,044 B2 | 12/2018 | DeVaul et al. |
| 10,196,123 B2 | 2/2019 | de Jong |
| 10,207,802 B2 | 2/2019 | Knoblach et al. |
| 10,207,811 B2 | 2/2019 | Biehl |
| 10,279,902 B2 | 5/2019 | Childress et al. |
| 10,336,432 B1 | 7/2019 | Farley et al. |
| 10,696,400 B2 | 6/2020 | Knoblach et al. |
| 10,737,754 B1 | 8/2020 | Farley et al. |
| 10,787,268 B2 | 9/2020 | Leidich et al. |
| 10,829,192 B1 | 11/2020 | Farley et al. |
| 10,829,229 B2 | 11/2020 | MacCallum et al. |
| 10,875,618 B2 | 12/2020 | Ponda et al. |
| 10,988,227 B2 | 4/2021 | MacCallum et al. |
| 11,447,226 B1 | 9/2022 | Farley et al. |
| 2003/0040273 A1 | 2/2003 | Seligsohn et al. |
| 2003/0127560 A1 | 7/2003 | Liss |
| 2004/0059476 A1 | 3/2004 | Nichols |
| 2004/0135033 A1 | 7/2004 | Hung |
| 2004/0218397 A1 | 11/2004 | Luo |

(56) References Cited

U.S. PATENT DOCUMENTS

| | | |
|---|---|---|
| 2005/0040290 A1 | 2/2005 | Suhami |
| 2005/0288114 A1 | 12/2005 | Meadows |
| 2007/0164600 A1 | 7/2007 | Chiu |
| 2007/0272801 A1 | 11/2007 | Hilliard et al. |
| 2009/0045284 A1 | 2/2009 | Chu |
| 2009/0134277 A1 | 5/2009 | Kim et al. |
| 2010/0282896 A1* | 11/2010 | Dohi .................. B64C 31/036 244/13 |
| 2011/0147513 A1 | 6/2011 | Surmont |
| 2011/0198437 A1 | 8/2011 | Brandon |
| 2011/0220764 A1 | 9/2011 | Suh |
| 2012/0049005 A1 | 3/2012 | Suh |
| 2013/0043341 A1 | 2/2013 | Tai et al. |
| 2013/0177322 A1 | 7/2013 | DeVaul et al. |
| 2014/0014770 A1 | 1/2014 | Teller et al. |
| 2015/0024653 A1 | 1/2015 | Huebl |
| 2015/0336653 A1 | 11/2015 | Anderson et al. |
| 2016/0018823 A1 | 1/2016 | Longmier et al. |
| 2016/0052614 A1 | 2/2016 | Longmier et al. |
| 2016/0083068 A1 | 3/2016 | Crites |
| 2016/0096612 A1 | 4/2016 | Longmier et al. |
| 2016/0207605 A1 | 7/2016 | Jensen et al. |
| 2016/0368202 A1 | 12/2016 | Crites |
| 2017/0331177 A1 | 11/2017 | MacCallum et al. |
| 2018/0093750 A1 | 4/2018 | Svoboda, Jr. |
| 2019/0233088 A1 | 8/2019 | Hayes et al. |
| 2020/0331609 A1 | 10/2020 | Knoblach et al. |
| 2021/0114707 A1 | 4/2021 | Farley et al. |
| 2021/0122479 A1 | 4/2021 | MacCallum et al. |
| 2021/0123741 A1 | 4/2021 | Candido et al. |
| 2021/0124352 A1 | 4/2021 | Candido et al. |
| 2021/0181768 A1 | 6/2021 | Candido et al. |
| 2021/0309338 A1 | 10/2021 | MacCallum et al. |

FOREIGN PATENT DOCUMENTS

| | | |
|---|---|---|
| CN | 202765296 | 3/2013 |
| CN | 102673770 | 3/2015 |
| CN | 204937453 | 1/2016 |
| DE | 223241 | 7/1909 |
| DE | 38 05 645 | 7/1988 |
| DE | 39 27 297 | 2/1991 |
| DE | 19634017 | 2/1998 |
| DE | 10 2008 035 028 | 1/2010 |
| EP | 0 401 891 | 12/1992 |
| EP | 3 268 279 | 1/2018 |
| EP | 3 414 157 A1 | 12/2018 |
| EP | 3 414 157 B1 | 11/2020 |
| FR | 2 320 229 | 3/1977 |
| FR | 2 724 909 | 3/1996 |
| FR | 2 834 966 | 7/2003 |
| GB | 191207587 | 9/1912 |
| GB | 2184699 | 7/1987 |
| GB | 2244962 | 12/1993 |
| JP | 2002-096798 | 4/2002 |
| KR | 10-1699797 | 2/2017 |
| RU | 2 028 962 | 2/1995 |
| RU | 2 112 709 | 6/1998 |
| RU | 2 186 003 | 7/2002 |
| WO | WO 1990/09830 | 9/1990 |
| WO | WO 1997/015992 | 5/1997 |
| WO | WO 2004/106156 | 12/2004 |
| WO | WO 2005/012086 | 2/2005 |
| WO | WO 2006/119056 | 11/2006 |
| WO | WO 2007/079788 | 7/2007 |
| WO | WO 2009/129642 | 10/2009 |
| WO | WO 2010/130043 | 11/2010 |
| WO | WO 2011/160172 | 12/2011 |
| WO | WO 2013/041820 | 3/2013 |
| WO | WO 2014/025622 | 2/2014 |
| WO | WO 2014/193711 | 12/2014 |
| WO | WO 2015/031165 | 3/2015 |
| WO | WO 2015/076899 | 5/2015 |
| WO | WO 2015/094534 | 6/2015 |
| WO | WO 2015/094941 | 6/2015 |
| WO | WO 2015/102813 | 7/2015 |
| WO | WO 2015/122988 | 8/2015 |
| WO | WO 2015/130414 | 9/2015 |
| WO | WO 2015/157237 | 10/2015 |
| WO | WO 2015/196216 | 12/2015 |
| WO | WO 2016/081345 | 5/2016 |
| WO | WO 2016/145130 | 9/2016 |
| WO | WO 2016/209762 | 12/2016 |
| WO | WO 2017/127746 | 7/2017 |
| WO | WO 2017/139283 | 8/2017 |
| WO | WO 2017/180780 | 10/2017 |

OTHER PUBLICATIONS

Aerospace-Technology.com: "World View Successfully Completes Test Flight for Commercial Balloon Flights," Aerospace-Technology. com, online article dated Oct. 27, 2015. http://www.aerospace-technology.com/news/newsworld-view-test-flights-commercial-balloon-flight-4702892.

Aljazeera America: "Space tourism company breaks record with high-altitude balloon flight", online article dated Jun. 25, 2014. http://america.aljazeera.com/articles/2014/6/25/balloonspace-tourism.html.

Benton, J. et al.: "On Development of Autonomous HAHO Parafoil System for Targeted Payload Return", AIAA Aerodynamic Decelerator Systems (ADS) Conference, Mar. 2013, in 26 pages.

Berger, E.: "Record-Breaking Balloon Flight", Outside Online, online article dated Jun. 25, 2014. http://www.outsideonline.com/1804196/record-breakingballoon-flight.

Bil, C.: "Lighter-Than-Air Stationary Observation Platforms", 15th Australian International Aerospace Congress (AIAC15), Feb. 2013, pp. 97-103.

Boyle, A.: "Heads Up, Strato-Tourists: World View Begins High-Flying Tests", NBC News, online article dated Jun. 24, 2014. http://www.nbcnews.com/science/space/heads-stratotourists-world-view-begins-high-flying-tests-n138986.

Boyle, A.: "World View Balloon Lofts NASA Experiments to Near-Space Heights," NBC News, online article dated Mar. 9, 2015. http://www.nbcnews.com/science/space/world-view-balloon-lofts-nasa-experiments-near-space-heights-n320216.

Browne, M.: "Balloon Teams Vie to be First Around World", The New York Times, published Jun. 7, 1994, in 6 pages.

Cherry, N. J. et al.: "Characteristics and Performance of Three Low-Cost Superpressure Balloon (Tetroon) Systems", Journal of Applied Meteorology, vol. 10, 1971, pp. 982-990.

Clausing, J.: "Arizona company successfully tests high-altitude balloon for space tourism", US News, online article dated Jun. 24, 2014. http://www.usnews.com/news/business/articles/2014/06/24/company-successfully-tests-space-tourism-balloon.

Coldiron, et al., "Crew Escape Systems 21002", https://www.nasa.gov/.../383443main_crew_escape_workbook.pdf, Jan. 17, 2005.

De Jong, M., Venus Altitude Cycling Balloon, Venus Lab and Technology Workshop, paper 4030, Apr. 7, 2015, in 1 page.

Denuder, M.: "Development of a Paraglide-Deployment System for a Base Jumping Robot", Bachelor-Thesis, Swiss Federal Institute of Technology Zurich, Jun. 2011, in 111 pages.

Epley, L.E: "A System Architecture for Long Duration Free Floating Flight for Military Applications", CIRRUS Aerospace Corporation, Aug. 31, 1990, in 65 pages.

Etherington, D.: "World View's 'stratollites' and new spaceport aim to change the business of space", TechCrunch, posted Feb. 23, 2017, in 9 pages. URL: https://techcrunch.com/2017/02/23/world-views-stratollites-and-new-spaceport-aim-to-change-the-business-of-space/.

Foust, J.: "World View tests scale model of its high-altitude balloon system", NewSpace Journal, online article dated Jun. 24, 2014. http://www.newspacejournal.com/2014/06/24/worldview-tests-scale-model-of-its-high-altitude-balloon-system/.

Gannon, M.: "World View Launches Test Balloon to Edge of Space, Breaks Record", Space.com, online article dated Jun. 24, 2014. http://www.space.com/26340-world-view-balloon-testflight-record.html.

(56) References Cited

OTHER PUBLICATIONS

Gorham, P.:"NASA long duration balloon program", Nov. 7, 2012, presented at SpacePart12 4th International Conference on Particle and Fundamental Physics in Space, CERN, Nov. 5-7, 2012, accessed Nov. 8, 2016. http://indico.cern.ch/event/197799/contributions/371922/.
Hanagud, A.V. et al.: "A Solar Pointing System for the Long Duration Balloon Missions", AIAA—97—1516, 1997, accessed on Novembers, 2016. http://arc.aiaa.org/doi/pdf/10.2514/6.1997-1516.
Haugen, J.: "After Successful Flight Test, World View Ready for Next Phase: The Stratospheric Tourism Company Is Setting Its Sights High," Popular Science, online article dated Oct. 26, 2015. http://www.popsci.com/world-view-completes-first.
Howell, E.: "World View Makes Record-Setting Parafoil Flight from Near Edge of Space," Space.com, online article dated Feb. 21, 2015. http://www.space.com/28626-world-view-parafoil-record-flight.html.
Howell, E.: "World View Parafoil Test Flight Touches Edge of Space," Discovery News, online article dated Feb. 23, 2015. http://www.seeker.com/world-view-parafoil-test-flight-touches-edge-of-space-1769541739.html#news.discovery.com.
Jones, J.: "Long-Life Stratospheric Balloon System With Altitude Control", NASA Tech Briefs, online article posted Jan. 1, 2002. http://www.techbriefs.com/component/content/article/ntb/tech-briefs/physical-sciences/2248.
Klotz, I.: "World View Prototype Balloon Reaches for Edge of Space", Seeker, online article dated Jun. 25, 2014. http://www.seeker.com/world-view-prototype-balloon-reaches-for-edge-of-space-1768745428.html#news.discovery.com.
Knapp, A.: "World View Has a Successful Scaled Test Flight of Its Balloon to Space", Forbes, online article dated Jun. 24, 2014. http://www.forbes.com/sites/alexknapp/2014/06/24/world-view-has-a-successful-scaled-test-flight-of-its-balloon-tospace/#4e726063f229.
Lachenmeier, T.T.: "Design of a Trans-Global Manned Balloon System with Relevance to Scientific Ballooning", American Institute of Aeronautics and Astronautics, Inc., DOI: 10.2514/6.1991-3687, Oct. 1991.
Larimer, S.: "Company takes test flight to the least-crowded tourism hot spot: space", The Washington Post, online article dated Jun. 27, 2014. http://www.washingtonpost.com/news/postnation/wp/2014/06/27/company-takes-test-flight-to-theleast-crowded-tourism-hot-spot-space/.
Lawler, R.: "Google exec sets a new record for highest-altitude jump (video)", Engadget, online article published Oct. 24, 2014. https://www.engadget.com/2014/10/24/google-exec-alan-eustace-stratex-high-altitude-jump/.
Logan, M.: "Flight Brings US Closer to Balloon-Powered Space Tourism", online article dated Feb. 3, 2015. http://www.wired.com/2015/03/parafoil-world-view/.
Longhetto, A.: "Some Improvements in the Balanced Pilot Balloons Technique", Atmospheric Environment Pergamon Press, vol. 5, 1971, pp. 327-331.
Markoff, J.: "Parachutist's Record Fall: Over 25 Miles in 15 Minutes", The New York Times, online article published Oct. 24, 2014. http://www.nytimes.com/2014/10/25/science/alan-eustace-jumps-from-stratosphere-breaking-felix-baumgartners-world-record.html?_r=1.
Moon, M.: "World View Tests a Small Version of Its Balloon-powered Spacecraft," MSN News, online article dated Oct. 27, 2015. http://www.msn.com/en-us/news/technology/world-view-tests-a-small-version-of-its-balloon-powered-spacecraft/ar-BBmtkdA.
New Atlas: "Google exec sets new high-altitude skydiving world record", New Atlas, online article published Oct. 26, 2014. http://newatlas.com/alan-eustace-world-record-skydive-stratex/34423/pictures.
Nobuyuki, Yajima, et al: "Dual Balloon Systems", Scientific Ballooning: Technology and Applications of Exploration Balloons Floating in the Stratosphere and the Atmospheres of Other Planets. Springer Science & Business Media, Apr. 2009, pp. 48-52 (via Google Books). https://books.google.com.sg/books?id=_iEHI7Nh6yYC&Ipg=PA51&dq=(super%20pressure%20and%20zero%20pressure%20balloon)%20(tandem%20OR%20buoyant)&pg=PR1#v=onepage&q=(super%20 pressure%20and%20zero%20pressure%20balloon)%20(tandem%20OR%20buoyant)&f=false.
Noor, A. et al.: "Stratospheric Aircraft", Future Aeronautical and Space Systems. American Institute of Aeronautics and Astronautics, Inc., vol. 172, 1997, p. 241 (via Google Books). https://books.google.com.sg/books?id=uuR5yBwvhsQC&Ipg-PA241&dq=(super%20pressure%20and%20zero%20pressure%20balloon)%20(tandem%200R%20buoyant)&pg=PA241#v=onepage&q=(super%20pressure%20and%20zero%20pressure%20balloon)%20(tandem%200R%20buoyant)&f=false.
NuancedAdmin: "Paragon Completes Record-Breaking Near-Space Dive Via High-Altitude Balloon", Paragon Space Development Corporation, press release dated Oct. 20, 2015.
O'Callaghan, J.: "Balloon Capsule That Will Take People To The Edge Of Space Completes Test Flight," IFLSCIENCEI, online article dated Oct. 28, 2015. http://www.iflscience.com/space/balloon-will-take-people-edge-space-capsule-completes-test-flight/.
Ondish, A.: "Multi-stage pumps can deliver efficiency gains", Plant Engineering, Aug. 24, 2010, accessed Nov. 8, 2016. http://www.plantengineering.com/home/single-article/multi-stage-pumps-can-deliver-efficiency-gains-4623b966532d8cf9bba82d407aa82416.html.
Photograph of a parafoil in high altitude flight (assumed to be prior art, but applicant reserves right to confirm actual date of photograph and to dispute status as prior art), accessed Jun. 20, 2016.
PR Newswire: "World View and Ball Aerospace Demonstrate Persistent Remote Sensing from Stratollite Platform", Yahoo Finance, posted Feb. 23, 2017, in 8 pages. URL: http://finance.yahoo.com/news/world-view-ball-aerospace-demonstrate-220000300.html.
Prosecution history for U.S. Appl. No. 15/065,828, filed Mar. 9, 2016.
Red Bull Stratos: "High Altitude Balloon", Red Bull Stratos, [date posted unknown], accessed online on Jul. 1, 2016. http://www.redbullstratos.com/technology/high-altitude-balloon/.
Saito, Y. et al.: "Properties of tandem balloons connected by extendable suspension wires", Advances in Space Research, vol. 45, 2010, pp. 482-489.
Saito, Y. et al.: "Development of a tandem balloon system with a super-pressure balloon and a zeropressure balloon I", Jaxa Research and Development Report, Japan Aerospace Exploration Agency, JAXA-RR-11 -008, Mar. 2012, in 16 pages.
Saito, Y. et al.: "Development of a tandem balloon system with a super-pressure balloon and a zero-pressure balloon II", Jaxa Research and Development Report, Japan Aerospace Exploration Agency, JAXA-RR-13-011, Mar. 2014, in 36 pages.
Smith, M.S. et al.: "Optimum Designs for Superpressure Balloons", Advances in Space Research, vol. 33, Iss. 10, Dec. 2004, in 9 pages.
Stratocat: "News Archive—Jun. 2012", StratoCat, page generated Aug. 2, 2015. http://stratocat.com.ar/news0612e.htm.
Wikipedia: "Sky anchor", Wikipedia, accessed May 21, 2016, in 1 page. https://en.wikipedia.org/wiki/Sky_anchor.
Wikipedia Commons: "File: Le premier parachute de Jacques Garnerin, ca. 1799.jpg", uploaded Aug. 12, 2010, in 3 pages. https://en.wikipedia.org/wiki/File:Le_premier_parachute_de_Jacques_Garnerin,_ca._1799.jpg.
Winzen et al.: "Operation Manhigh II", Journal of Jet Propulsion, vol. 28, No. 8, 1958, pp. 523-532.
World View: "Landmark Space Dive Sets Stage for World View Space Flights", World View, press release dated Oct. 24, 2014.
World View: "Major World View Test Flight Readies the Company to Begin Full Scale Flight Testing for Human Private Spaceflights", World View, press release dated Oct. 26, 2015.
World View: "Oct. 24, 2015 Milestone 10% Scale Test Flight", YouTube, published Oct. 24, 2015 (footage of parafoil seen in video), video can be accessed at https://www.youtube.com/watch?v=1-PpJHKHAQc (last accessed: Jul. 13, 2016).
World View: "The Stratollite", YouTube, published Feb. 23, 2017, video can be accessed at https://www.youtube.com/watch?v=GFdXBQPuznU (last accessed May 20, 2019).
World View: "World View Breaks World Record with Successful Test Flight for 2016 Journeys to Edge of Space", World View, press release dated Jun. 24, 2014.

(56) References Cited

OTHER PUBLICATIONS

World View: "World View Breaks World Record with Successful Test Flight", YouTube, published Jun. 23, 2014 (footage of parafoil in space seen in video), video can be accessed at https://www.youtube.com/watch?v=sdsVwN-ICX8 (last accessed: Jul. 13, 2016).
World View: "World View One Step Closer to Manned Near-Space Voyages with Record-Breaking Flight", World View, press release dated Feb. 20, 2015.
Amendment in Response to Office Action dated Apr. 14, 2016, in U.S. Appl. No. 14/188,581, filed Aug. 15, 2016.
Office Action in U.S. Appl. No. 14/188,581, dated Apr. 14, 2016.
Final Office Action in U.S. Appl. No. 14/188,581, dated Dec. 27, 2016.
International Preliminary Report on Patentability in International Application No. PCT/US2016/021635, dated Sep. 21, 2017.
International Search Report and Written Opinion in International Application No. PCT/US2016/021635, dated Jun. 16, 2016.
International Search Report and Written Opinion in International Application No. PCT/US2017/014432, dated Apr. 6, 2017.
International Search Report and Written Opinion in International Application No. PCT/US2017/016861, dated Apr. 14, 2017.
U.S. Appl. No. 16/940,084, filed Jul. 27, 2020 (Unpublished).

\* cited by examiner

RIGIDIZED ASSISTED OPENING SYSTEM FOR HIGH ALTITUDE PARAFOILS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application is a continuation of U.S. patent application Ser. No. 15/065,828, filed Mar. 9, 2016, and entitled "Rigidized Assisted Opening System For High Altitude Parafoils," which claims the benefit of priority under 35 U.S.C. § 119(e) of U.S. Provisional Patent Application No. 62/130,395, filed on Mar. 9, 2015, and entitled "Rigidized Assisted Opening System For High Altitude Parafoils," and the benefit of priority under 35 U.S.C. § 119(e) of U.S. Provisional Patent Application No. 62/239,154, filed on Oct. 8, 2015, and entitled "Rigidized Assisted Opening System For High Altitude Parafoils," the entire disclosure of each of which is incorporated herein by reference for all purposes.

BACKGROUND

Field

The present invention relates to a system to mechanically assist with opening a parafoil. More specifically, the present invention is related to assisting in the opening of a parafoil transitioning from a state where it is not flying to a state where it is flying, especially when that system is starting with little to no airspeed, starting in low density air, or both. Mechanically aiding in the opening of a parachute allows parafoils to inflate and fly in environments where they otherwise may not have been capable of opening and transitioning to flight reliably. Avoiding entanglement is also important during the period of low air speeds, in low density air (such as at high altitudes), or both, where there is no force of wind to hold the parachute fabric away from the payload and from entangling with itself. Thus embodiments of the present invention preferably serve a dual purpose both as a mechanism to assist in the opening of the parafoil envelope and as an anti-entanglement device holding the fabric, lines and payload away from each other so they cannot snag or tangle

Description of the Related Art

Note that the following discussion may refer to a number of publications and references. Discussion of such publications herein is given for more complete background of the scientific principles and is not to be construed as an admission that such publications are prior art for patentability determination purposes.

The word parafoil is, appropriately, the combination of the words "parachute" and "airfoil". A parafoil is essentially an inflatable wing combining the light weight and packability of a parachute with the cross-range, steerability and landability of an airfoil. A parafoil is often referred to as a parachute or a ram air parachute, and may be referred to as such herein. Parafoils comprise a fabric canopy and parachute lines. Parafoils have a much more complex opening and inflation dynamic than round parachutes do. Because the wing is typically inflated from the leading edge the inflation process happens in multiple stages. This opening dynamic is problematic at high altitudes. Because the air at high altitudes is thin, and the inflation ports of the canopy do not necessarily face the airstream, there is substantial risk when using parafoils at high altitude that they will fail to inflate for too long a period. At this point, once the canopy orients and finally does inflate, the airspeeds may be too high and the opening could destroy the parafoil or whatever is beneath it.

SUMMARY

The present invention is a method of opening a parafoil comprising a canopy and a plurality of flexible members, the method comprising deforming the flexible members, thereby storing elastic potential energy in the flexible members, wherein a top end of each flexible member is connected to the parafoil canopy; securing the parafoil canopy and the deformed flexible members in a stowed configuration; attaching the parafoil to a flight vehicle; detaching the parafoil from the flight vehicle; releasing the parafoil canopy and the flexible members; and the flexible members returning to their undeformed shape, thereby at least partially deploying the parafoil canopy. The base end of each flexible member is preferably connected to a base member, optionally via a hinge, with the base member connected to a payload. The method optionally comprises one or more suspension lines, but not all suspension lines, supporting the weight of the payload during flight of the flight vehicle, the suspension lines connecting the base member and the canopy. The deforming step preferably comprises bringing the top ends of the flexible members together, the flexible members bending around a plate or fulcrum disposed between the top ends and the base ends. After the releasing step, the flexible members preferably spread apart from each other past a vertical orientation, at which point gravity preferably continues to spread apart the flexible members until the parafoil canopy is completely deployed. The deforming step preferably comprises folding the parafoil canopy and the securing step comprises disposing the folded parafoil canopy in a parachute bag. The detaching and releasing steps are optionally performed at an altitude greater than approximately 25,000 feet, or greater than approximately 50,000 feet. The releasing step is optionally performed before or approximately simultaneously with the detaching step.

The present invention is also a parafoil comprising a canopy; a base member connected to the canopy via a plurality of suspension lines; and a plurality of flexible members attached to the canopy. The flexible members are preferably attached to the base member, optionally via a hinge. The base member optionally comprises a fulcrum for bending each flexible member; alternatively, the parafoil comprises a plate disposed between the base member and the canopy for bending the flexible members. Each flexible member optionally comprises a hollow tube, in which case each flexible member optionally comprises a telescoping end attached to the canopy or a suspension line disposed within each flexible member.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims

BRIEF DESCRIPTION OF THE DRAWINGS

The accompanying drawings, which are incorporated into and form a part of the specification, illustrate the practice of embodiments of the present invention and, together with the description, serve to explain the principles of the invention. The drawings are only for the purpose of illustrating certain embodiments of the invention and are not to be construed as limiting the invention. In the figures.

DETAILED DESCRIPTION

The present invention pertains to the assisting in the opening of a parafoil either during or prior to separating from a supporting structure while in low density air, starting with little air speed, or both. Embodiments of the present invention use stored energy to assist in the opening of a parafoil. Some embodiments of the present invention include spring loaded rods pushing open the parafoil envelope, hinged rods that use potential energy of their weight in a stowed configuration to open a parafoil, or rods that use a combination of stored potential energy and spring energy to open a parafoil envelope. Other embodiments of the present invention include utilizing inflatable bladders to spread the parafoil envelope, inflating the parafoil directly with compressors or compressed gas, using the weight of the mass suspended beneath the parafoil to force a mechanical arm to open the parafoil, using thruster mechanisms to push the envelope open, using springs to open the bottom of the parafoil envelope or using deployable split-tube booms to assist in the opening of the canopy. One embodiment of the present invention utilizes flexible rods connected to a base structure with hinges to assist in opening a parafoil. The rods can be flexed using a fulcrum near the base structure to a central point where they are preferably restrained at the base of the packed parafoil. When released the rods preferably spring out and fall away from the central structure, optionally assisted by gravity, opening the parafoil envelope prior to, during, or after the release of the parafoil from the supporting structure. This embodiment can be operated using flexed rods acting like springs, hinged rods assisted by gravity, or preferably, a combination of both.

Figure 1:
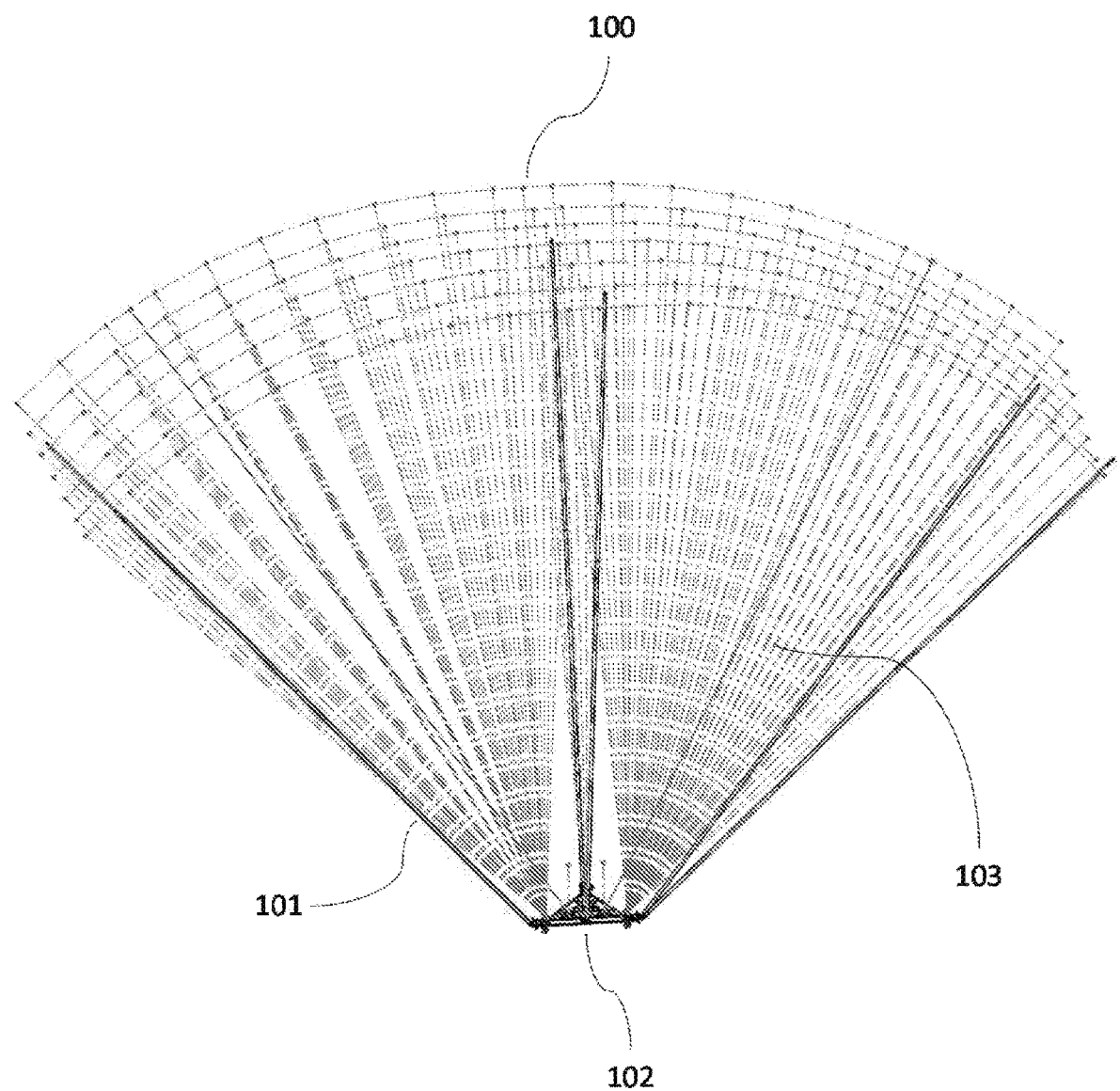
FIG. 1 is a diagram of a deployed parafoil according to a first embodiment of the present invention.
Figure 4:
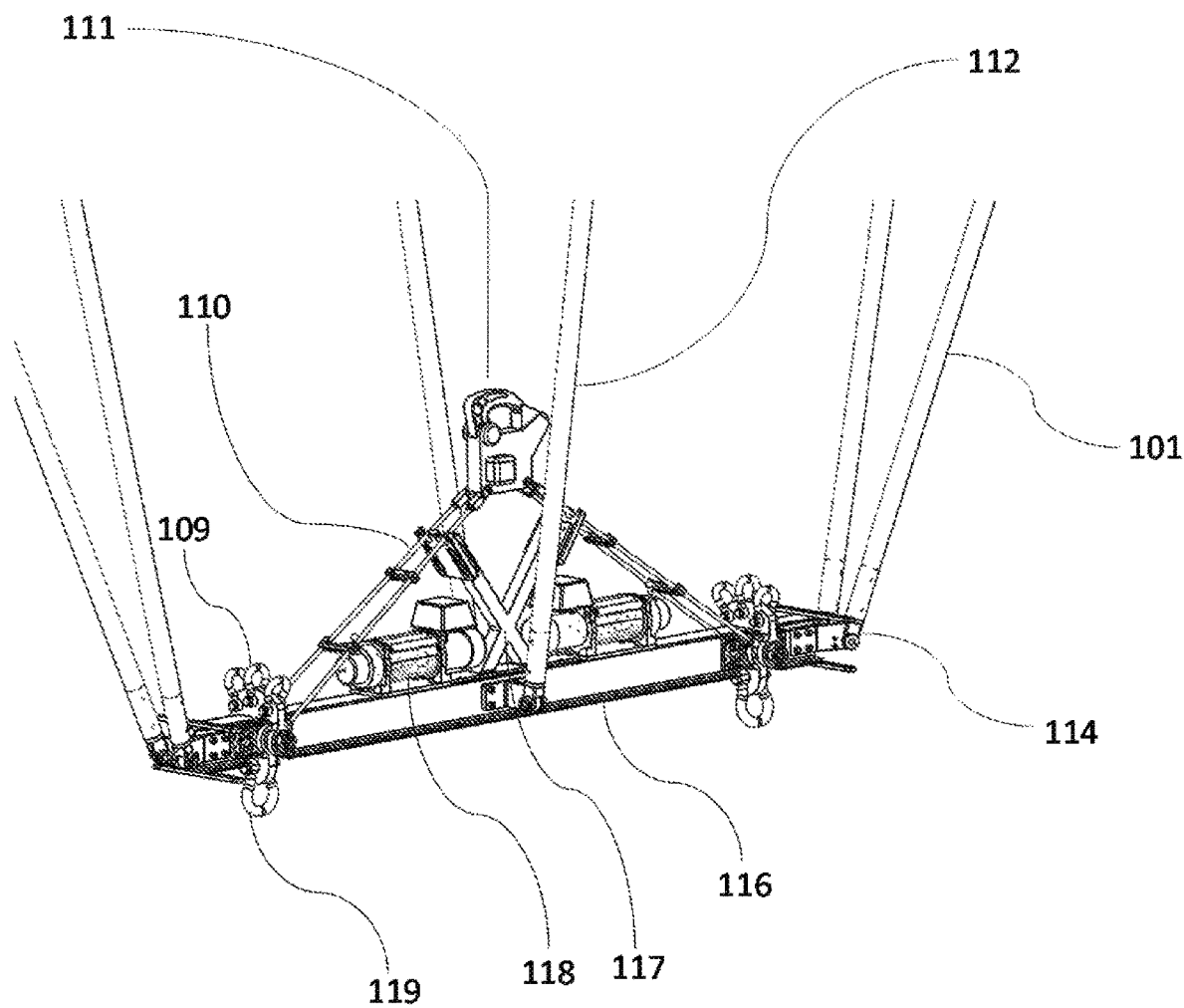
FIG. 4 is a diagram detailing the base structure of the parafoil of FIG. 1.

An embodiment of the present invention utilizes hinged flexible poles connected to a rigid base both supporting the poles and providing an attachment platform between a payload and a mechanism to lift the payload, such as a high altitude balloon. This embodiment is particularly useful for use with payloads having a mass greater than approximately 2,000 lbs., although it may be used with any payload. As shown in FIG. 1, supporting base structure 102, also referred to as a "riser bracket", provides the structural hub where the supporting vehicle, such as a high altitude balloon, connects to parafoil envelope 100. A detail of base structure 102 is shown in FIG. 4. The connection to the balloon is preferably made via a release mechanism such as release hook 111. Parachute lines 103 preferably attach using a mechanism such as attachment shackle 109. The base structure attaches to a payload via attachment shackle 119 and payload support lines (not shown). Main structural beam 116 for all the structures preferably comprises an I-beam or any appropriate structure depending on the mass of the payload and specific structural specifications of the system. The release mechanism could attach to a flight vehicle, such as a high altitude balloon via a tether running from the release mechanism through the parafoil 100 to the flight vehicle. Release hook 111 preferably attaches to main structural beam 116 via structural rods 110. Main structural beam 116 also preferably supports any other required equipment for operation of the parafoil, such as one or more control motors 118. The structural rods and release mechanism are preferably aligned using cross brace 117. The parafoil is preferably assisted in opening or is opened prior to release in an action referred to hereafter as "predeploy" by long flexible rods 101, also referred to as "wing tip supports". Centrally located wing tip supports 112 preferably support the nose and tail of the canopy during predeploy. In this embodiment the wing tip supports preferably comprise hollow poles which are aluminum, carbon fiber, or a combination thereof. The poles may be of any size, but in one embodiment they are 2.5" in diameter, with a 0.065" wall thickness. The tops of the wing tip supports preferably comprise aluminum to accommodate sliding of the plunger, as described below in reference to FIG. 6. The bottoms of the wing tip supports preferably comprise carbon fiber due to its lighter weight and higher strength. However, any combination, or any material by itself, may be used.

Figure 5:
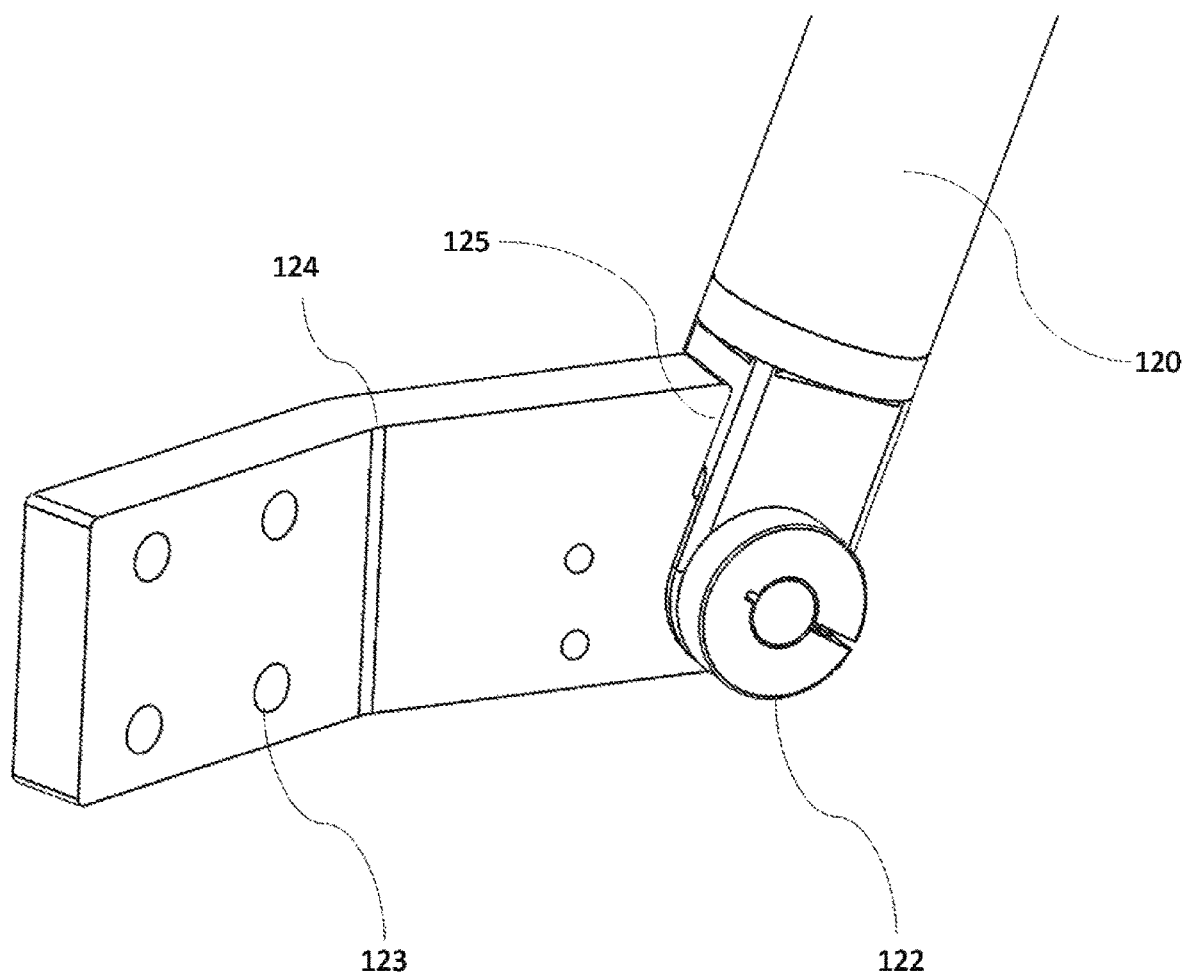
FIG. 5 details the hinge bracket attachment of the wing tip supports to the base structure.

Base 120 of each wing tip support is preferably fastened to main structural beam 116 via hinge bracket 114, a detail of which is shown in FIG. 5. The hinge bracket preferably attaches to the beam via bolts through mounting holes 123. The bracket may be angled to direct the wing tip support outward during the deployment process, which angle is preferably achieved via bend 124 in the bracket. The angle in the bracket preferably points the outside wing tip supports approximately towards the corners of the canopy when it is deployed. Angle 124 is preferably, but not limited to, approximately 20 degrees to achieve a substantially open canopy when deployed. Base 120 is preferably attached to the bracket via hinging mechanism 122 that allows it to rotate freely against the bracket. The initial angle of the wing tip support is preferably fixed by fulcrum 125 to a specific angle that will govern the spring load on the wing tip support when flexed. The angle will be determined by the size, geometry and material of the wing tip support as well as the configuration of the main structural beam and size of the parafoil. This angle is preferably, but not limited to, approximately 22 degrees.

Figure 6:
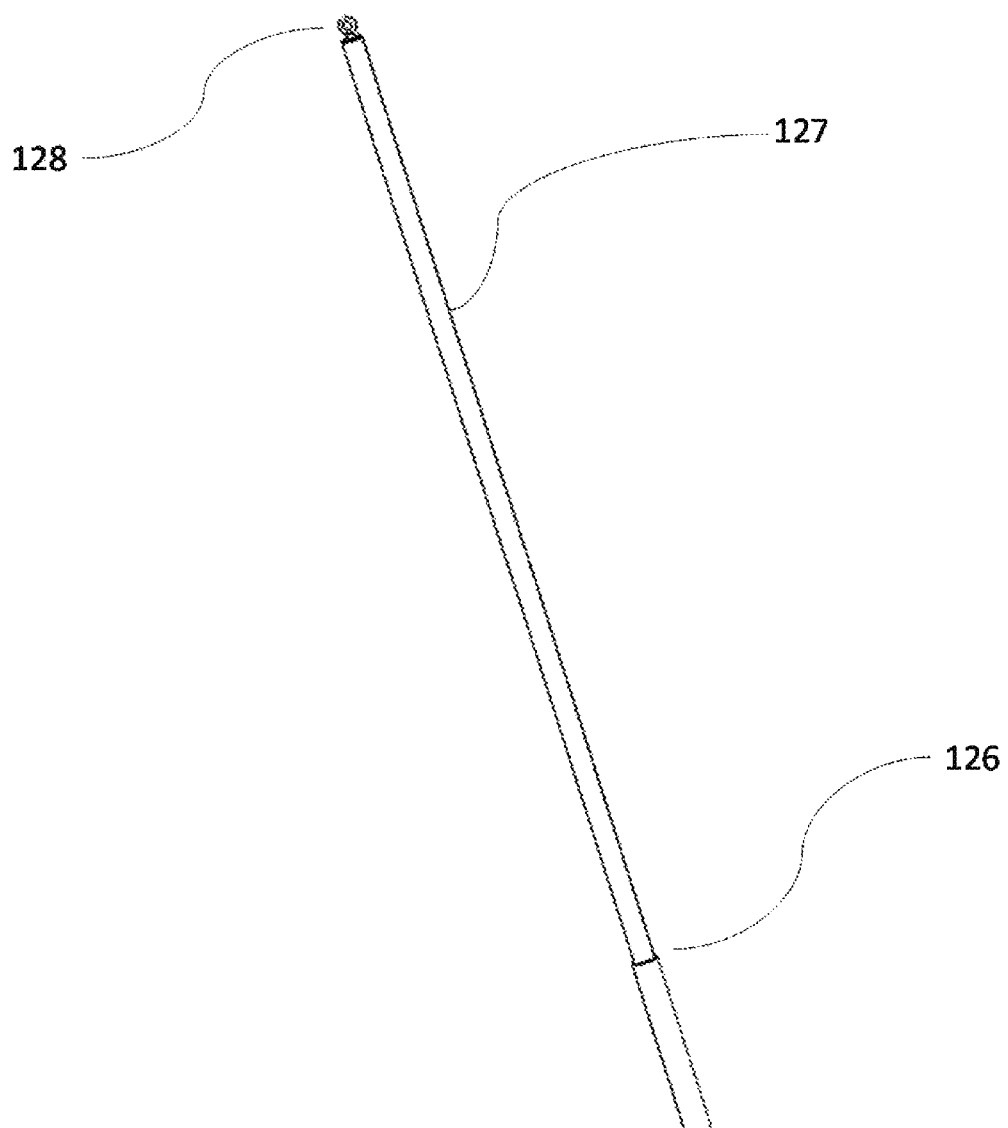
FIG. 6 shows telescoping wing tip supports.

The top of the wing tip support preferably comprises a pole that is allowed to translate along the axis of wing tip support in a linear fashion as shown in FIG. 6. The moveable part of the wing tip support is referred to hereafter as a "plunger". Plunger 127 slides in and out of the wing tip support by fitting inside it via sliding interface 126. This sliding contact can be achieved using a linear bearing, a free-fit interface, or any other mechanism that allows the plunger to translate in and out with respect to the wing tip support. The plunger preferably attaches to the canopy at attachment eye 128 that is fixed with respect to plunger 127. This linear freedom allows the canopy to fly in its natural shape. The design shape of the canopy is typically not identical to the actual shape of the canopy in flight, so some variability in the position of the wing tip support ends is preferable.

Figure 2:
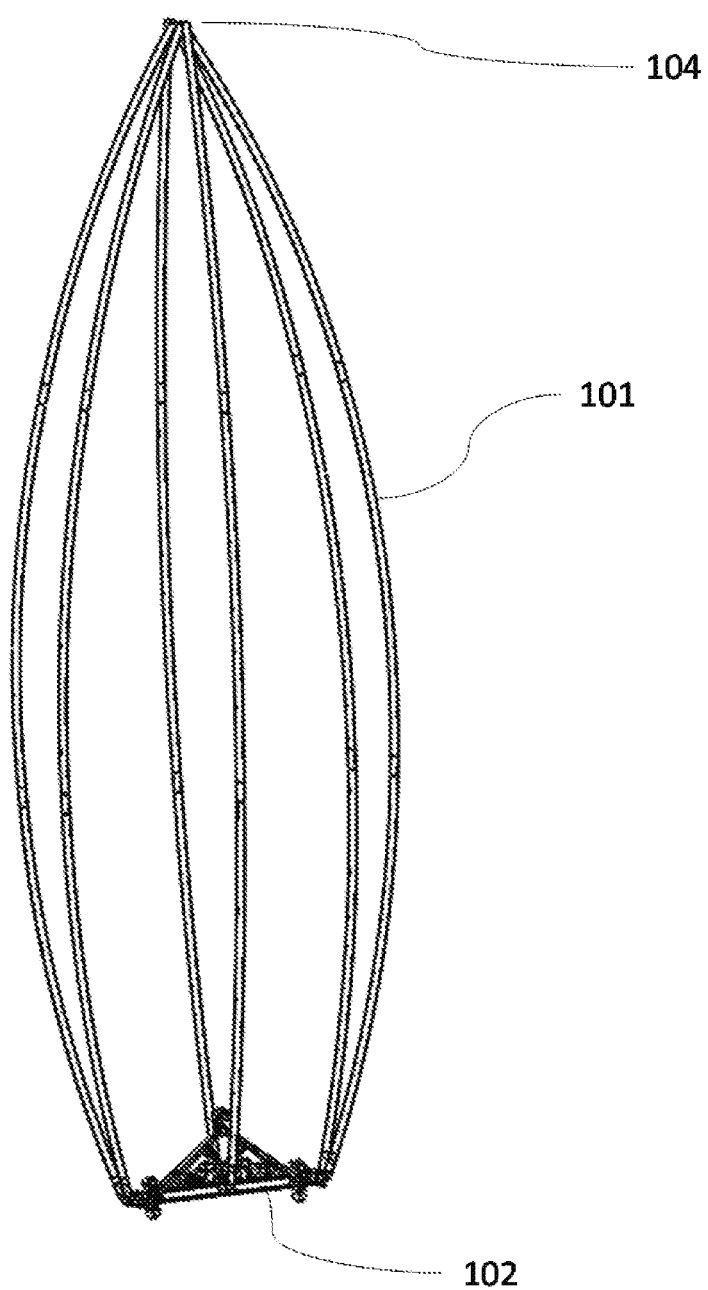
FIG. 2 is a diagram of the wing tip supports of parafoil of FIG. 1 in their stowed configuration.

The packed configuration of the parafoil can be seen in FIG. 2. When the parafoil canopy is packed the wing tip supports will be bent in around the fulcrum 125 to a central location at the tops 104 of the wing tip supports where they will be collected at the base of the parachute bag. Riser bracket 102 is where the hinge brackets are preferably located. Wing tip supports 101 are preferably flexed in and collected at the base of the parachute bag, similar to that shown in FIG. 9. The parachute bag, which is not shown in FIG. 2, is preferably just above the tops 104 of the wing tip supports, similar to the configuration shown in FIG. 22.

Figure 3:
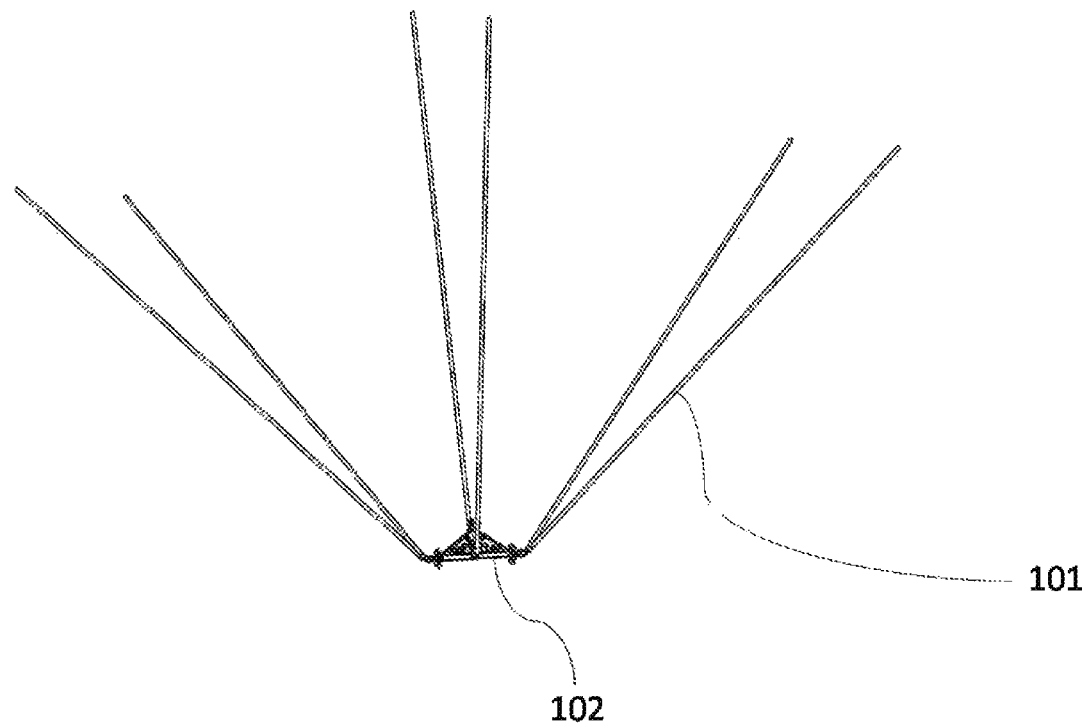
FIG. 3 is a diagram showing deployed wing tip supports.

When the stowed system shown in FIG. 2 is ready to be deployed, a closure loop could be cut or otherwise opened, similar to the opening as described in the second embodiment below, releasing the wing tip supports to spring and fall open. After being opened the wing tip supports preferably spread out in a similar fashion to that shown in FIG. 3. Riser bracket 102 holds the bases of wing tip supports 101. The parachute (not shown in FIG. 3) is preferably connected to the wing tip supports, the weight of which will hold the parachute open. The geometry of the parachute in the open state is shown in FIG. 1. Riser bracket 102 holds parachute lines 103 and the bases of wing tip supports 101. Parafoil envelope 100 is stretched out via the wing tip supports.

In another embodiment of the invention, the parafoil is predeployed or otherwise assisted in opening using flexed rods on hinged bases, similar to the previous embodiment. In this embodiment of the invention the wing tip supports are held by retention cords while stowed, instead of flexed around a fulcrum. This embodiment of the invention is suitable for, but not limited to, payload masses between approximately 500 and 2000 lbs. In this embodiment of the invention payload 200 can be functionally recovered from a starting condition where the system has little starting airspeed or is in low density air.

Figure 9:
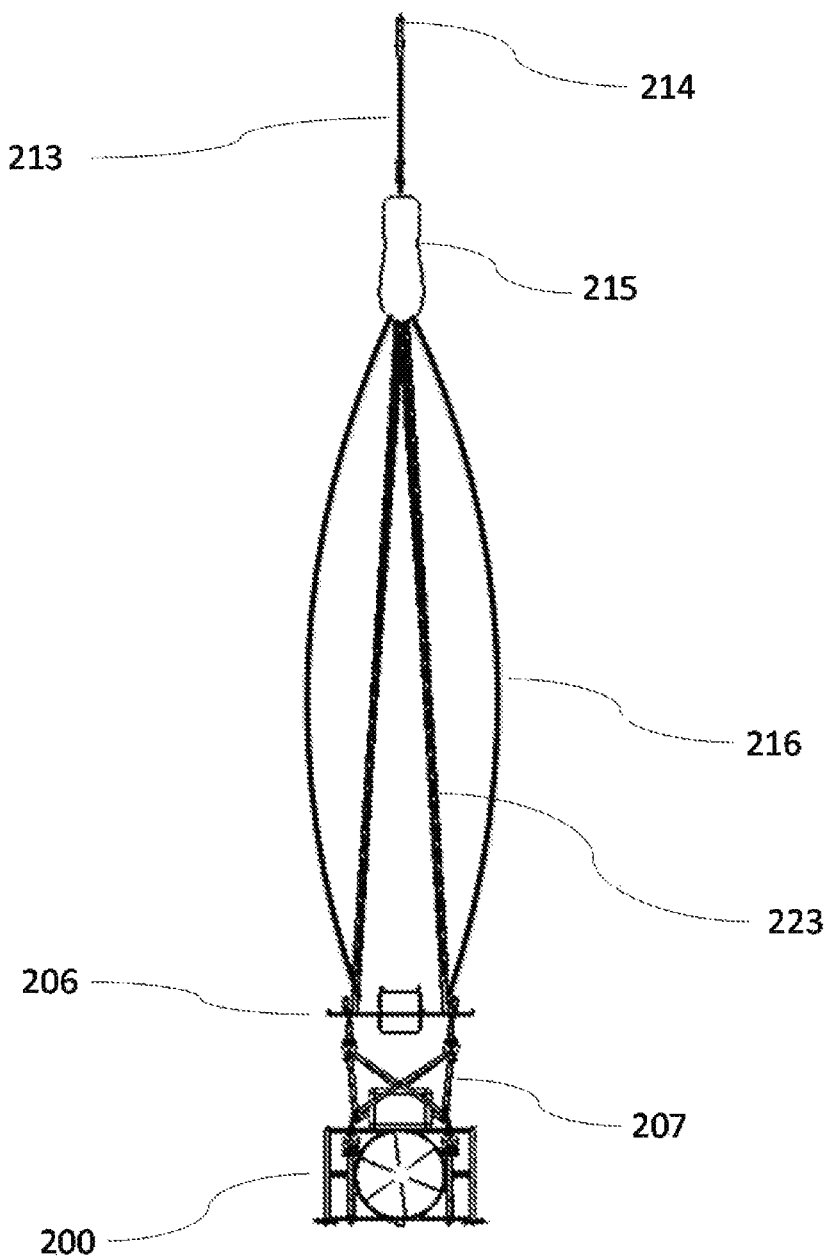
FIG. 9 shows suspension lines and wing tip support of the parafoil of FIG. 7 in their stowed configuration.

The system starts in a packed configuration as shown in FIG. 9. Payload 200 is suspended from structural platform or riser bracket 206, preferably attached thereto via payload riser 207. The riser bracket is preferably suspended from the parachute deployment bag 215 using the set of parachute suspension lines 223 which are taut by virtue of their lengths during ascent. Suspension lines 223 are preferably attached to parachute deployment bag 215 via rings 202, which together preferably carry the structural suspension load of the system via structural strap 213 that preferably attaches the system to the balloon via connection device 214 (such as a structural shackle or carabiner).

Figure 22:
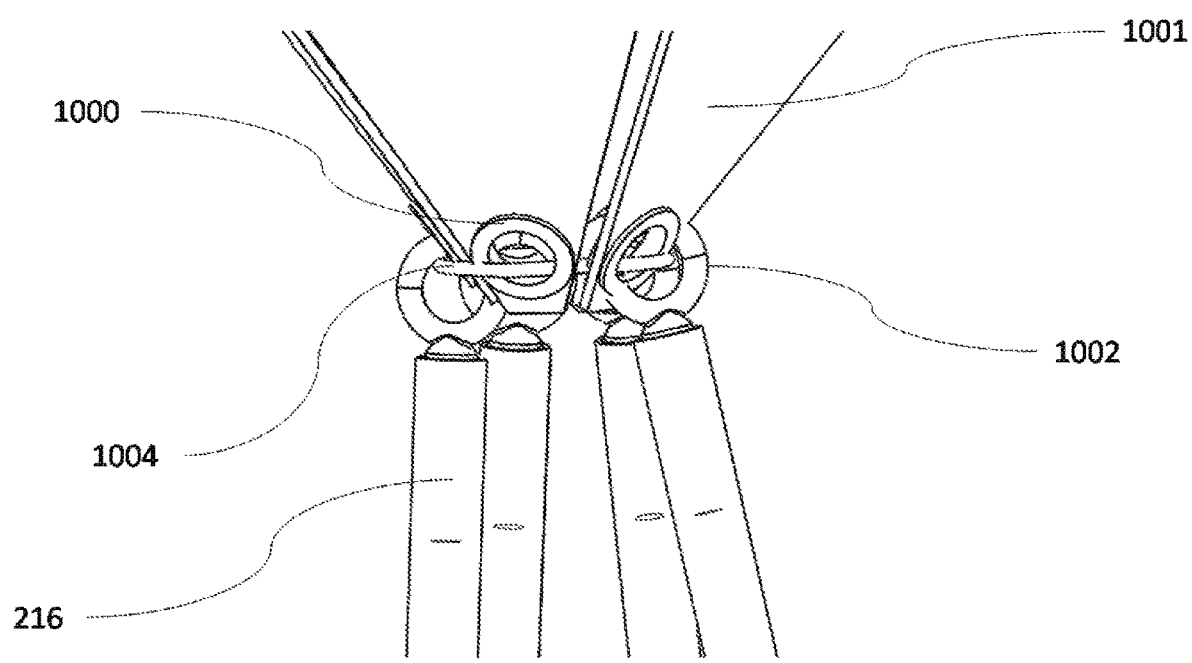
FIG. 22 is a detail of the connection of the wing tip supports to the parachute bag.

A detailed view of the attachment of wing tip supports 216 to parachute deployment bag 205 is shown in FIG. 22. A parachute container comprises a tubular parachute deployment bag that preferably houses the parachute in a typical "Proper Ram-air Orientation" PRO pack. The base of the bag preferably comprises fabric flaps 1001, preferably comprising metallic grommets 1000, used to hold the bag closed. Eyes 1002 on the top of wing tip supports 216 (or alternatively connected to the wing tip support plungers if used) are held together via closure loop 1004, thereby maintain the wing tip supports under stress in their flexure configuration. Closure loop 1004 weaves through grommets 1000 and wing tip support eyes 1002, preferably making a closed loop. That loop preferably both holds the wing tip supports in their flexed configuration and also holds the bag closed so the canopy cannot fall out. When the system is ready to deploy, closure loop 1004 is severed or otherwise released, opening the bag so that the canopy is free to open and allowing wing tip supports 216 to spring open due to their stored energy of flexure. The canopy is preferably connected to eyes 1002 inside parachute deployment bag 205, and thus is predeployed or deployed as the wing tip supports spring open and the bag is opened.

Figure 10:
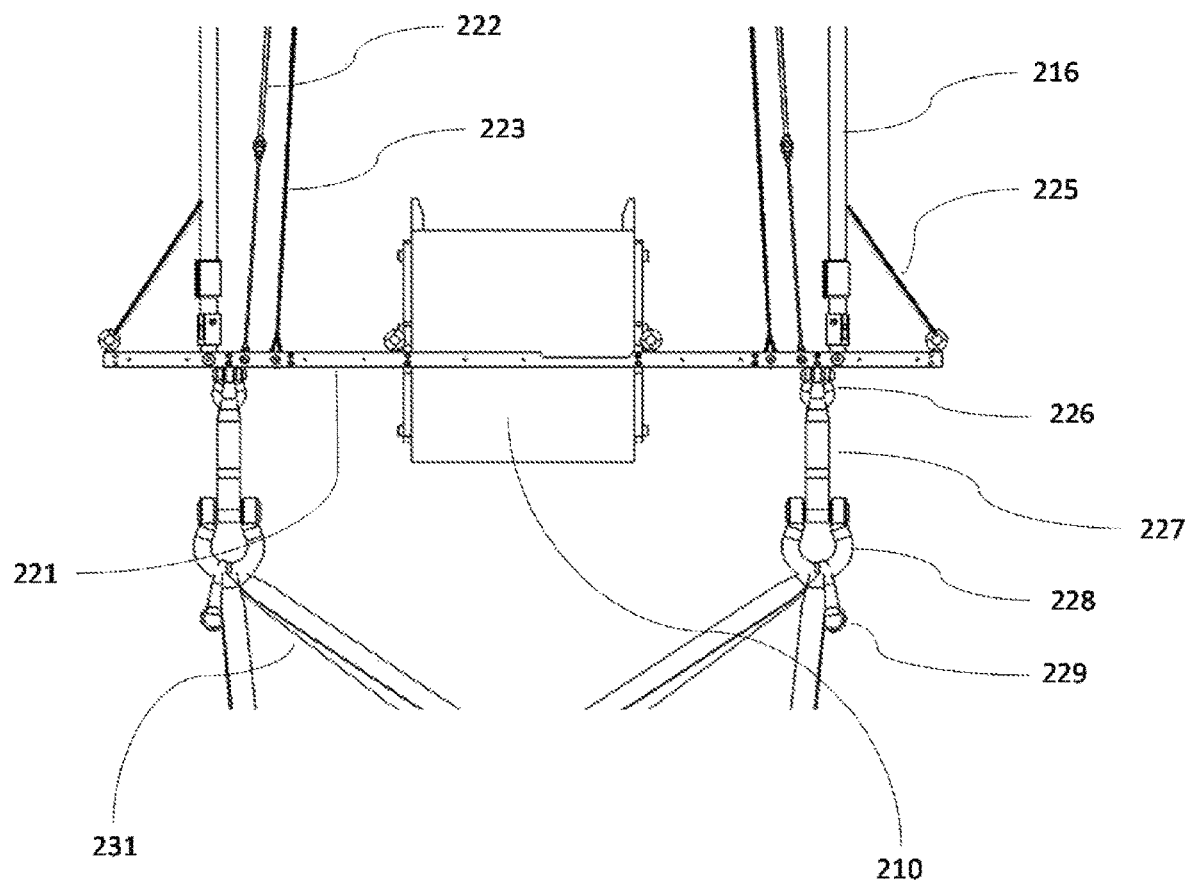
FIG. 10 is a detail of the base structure of the parafoil of FIG. 7.

A detailed view of riser bracket 220 can be seen in FIG. 10. Payload risers 231 attach the payload to separable structural shackles 228. The structural shackles connect to the riser bracket via "Y bridles" 227 connected to one or more riser bracket beams 221 via structural shackles 226, which preferably equalize the front-to back load and ensure that offsets in payload center of gravity do not create control inputs to the parafoil. If the system were tethered to the ground prior to a flight it could be tethered via ground support straps 229. Riser bracket beams 221 preferably hold any required support hardware such as an Aerial Guidance Unit 210. The system can be suspended from a flight vehicle, such as a high altitude balloon, using a set of parachute suspension lines 223. The remaining parachute suspension lines 222 are slack during ascent and taut after the parafoil is deployed. Wing tip supports 216 are preferably tethered to riser bracket beam 221 using restraint cords 225, which restrict the wing tip supports from falling inwards towards the canopy when released. The restraint cord may alternatively be set such that the wing tip supports naturally sit with an outward angle and must be bent inwards during the parachute packing process, thereby creating outward spring energy when released. In this embodiment the wing tip supports comprise hollow aluminum 1" diameter poles, although any material in any size may be used. The wing tip supports in this embodiment of the invention may employ plungers at the top of the wing tip supports, as described above, to more easily accommodate packing and a natural flight geometry.

Figure 7:
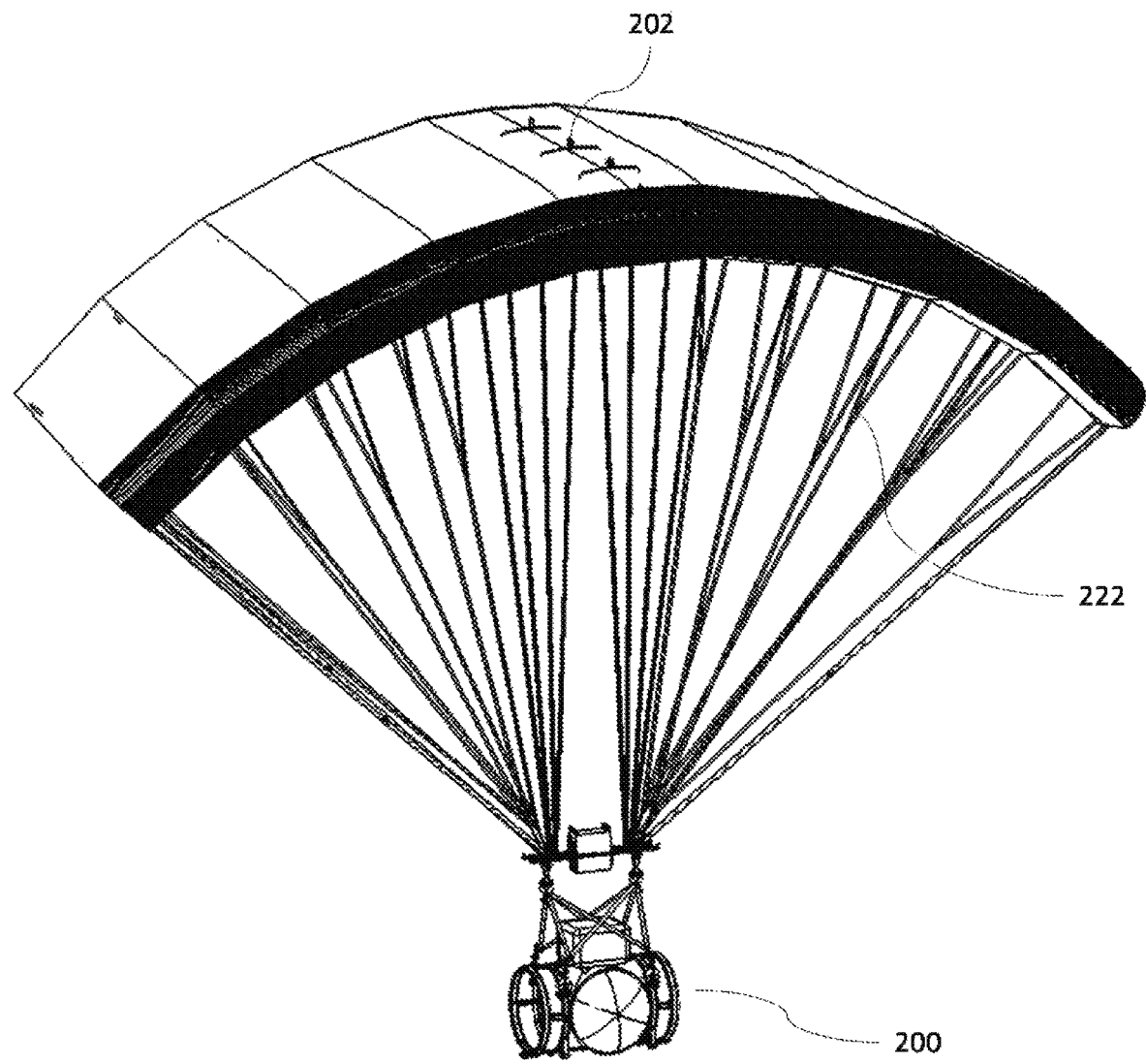
FIG. 7 is a perspective view of a deployed parafoil according to a second embodiment of the present invention.
Figure 8:
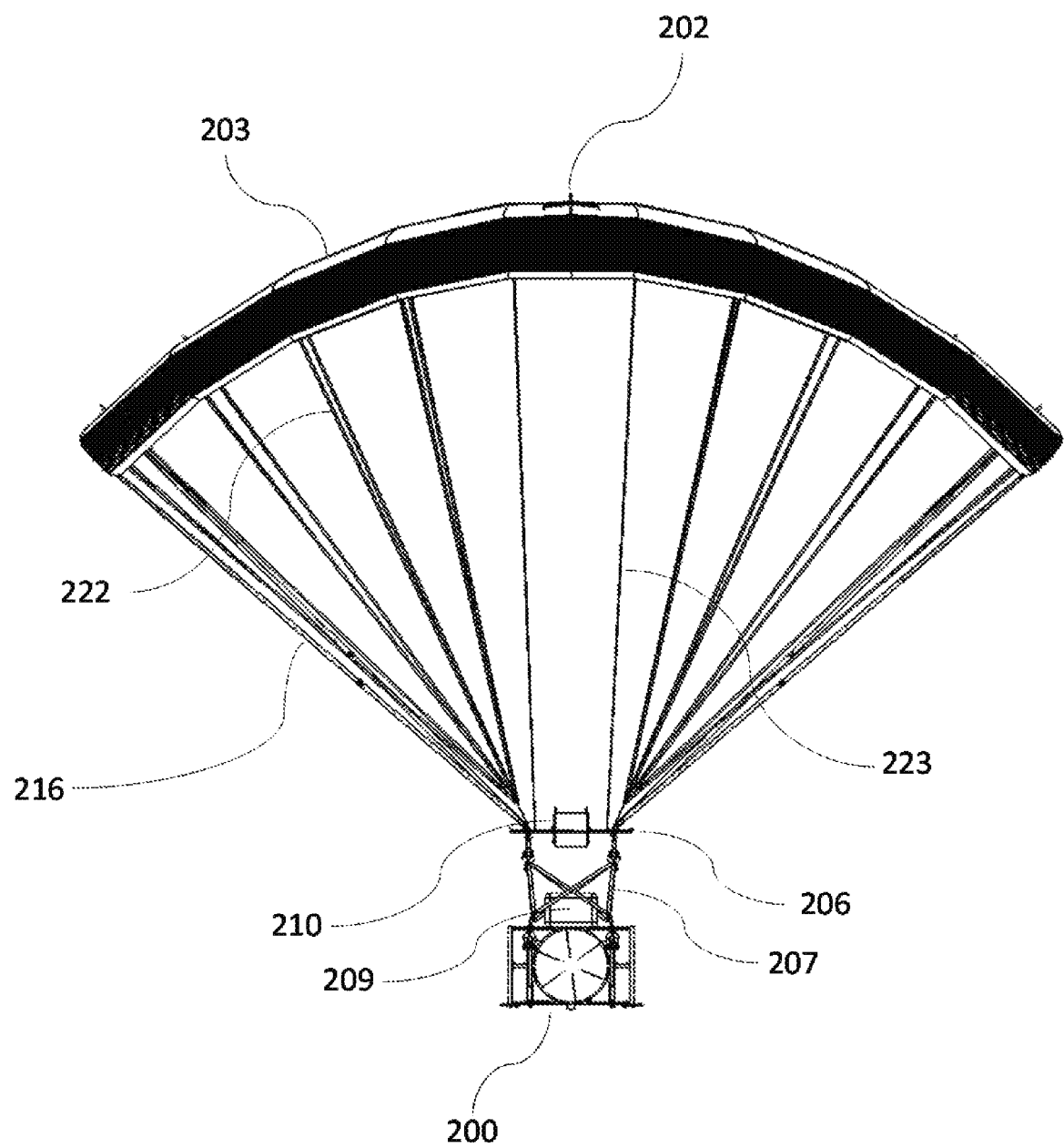
FIG. 8 is a front view of the deployed parafoil of FIG. 7.

Once flying the system is preferably suspended under the parafoil as shown in FIG. 7 and FIG. 8. Parafoil canopy 203 is preferably connected to riser bracket 206 via suspension lines 222, 223. Wing tip supports 216 are preferably not active at this time. The system is preferably controlled in flight by aerial guidance unit 210. The system may be coupled with a traditional reserve parachute 209 for added redundancy.

Rings 202 are for attaching the parafoil to the base of the balloon during ascent. This transfers the load due to the payload through suspension lines 223 to the flight vehicle, such as a high altitude balloon. For predeploy, the parachute deployment bag can be opened by severing a loop that holds both the bag closed and the wing tip supports under stress due to their bending, allowing the parachute to spring open before the release of rings 202 from the balloon. The parafoil is then released from the balloon by the release of rings 202. Alternatively, the parachute bag can be opened at approximately the same time as the release of rings 202 from the balloon.

Figure 12:
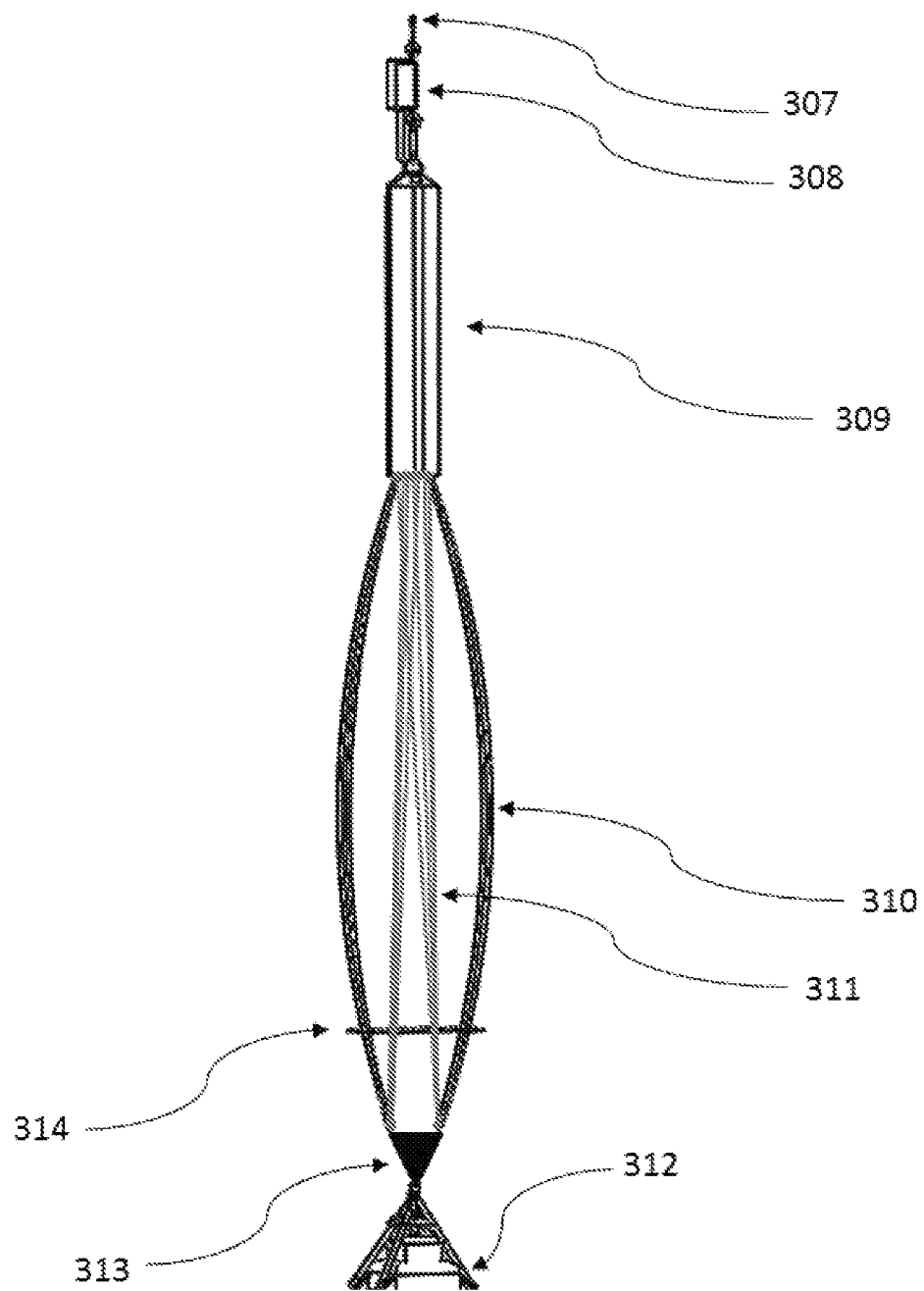
FIG. 12 shows rigidized and non-rigidized parachute suspension lines of the parafoil of FIG. 11 in their stowed configuration.

Another embodiment of the invention that allows a system to begin flight under a parafoil in situations where the system has little air speed, is in low density air, or both. This embodiment of the invention is suitable for, but not limited to, payloads having a mass less than approximately 500 lbs. In this embodiment of the invention select parachute suspension lines are rigidized (but still flexible) and flexed around a spreading plate to provide opening force. This embodiment of the invention does not comprise hinges or wing tip supports because the rigidized suspension lines are responsible for spreading the canopy. FIG. 12 shows this embodiment of the invention in its packed form. Non-rigidized parachute suspension lines 311 and rigidized parachute suspension lines 310 connect to a payload via payload risers 312 which preferably converge to triangular structural mounting plate 313. The rigidized suspension lines are preferably under stress, flexed outward by spreading plate 314. This spreading plate can be restricted using short tethers rigged to triangular structural mounting plate 313 so the spreading plate isn't vertically displaced during stowage. In this embodiment rigidized suspension lines 310 each preferably comprises a suspension line passed through a rigid tube, such as a 0.375" diameter hollow carbon fiber tube, having an inner diameter slightly larger than that of the suspension line. A select set of suspension lines is attached to the bottom of parachute deployment bag 309. The structural load path goes through parachute deployment bag 309 and through structural strap 308 to connecting device 307 (such as a threaded connector, shackle or carabiner).

Figure 13:
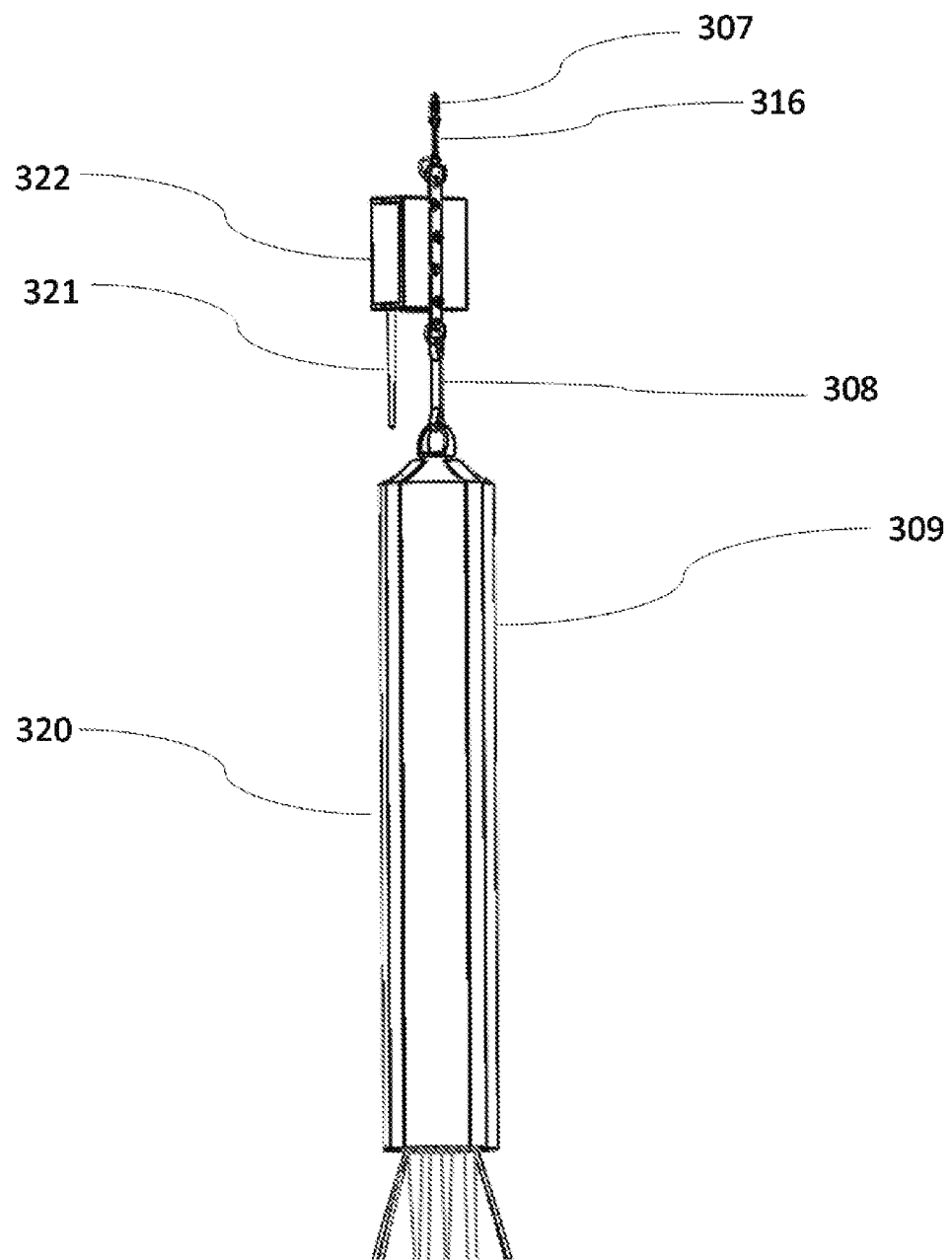
FIG. 13 shows the attachment structure at the top of the stowed configuration of the parafoil of FIG. 11.

A detail of the deployment bag and attachment structure at the top of the system is shown in FIG. 13. The load from the suspension lines is preferably carried through deployment bag 309 through straps sewn into the bag 320. The top of the bag connects to attachment strap 308, which preferably supports any equipment needed above the parachute system, such as an avionics box 322 and communication antenna 321 for actuating the release of the system. Above that hardware high side structural tether 316 preferably attaches to connection hardware 307 to connect the parachute system to a flight vehicle such as a high altitude balloon.

Figure 11:
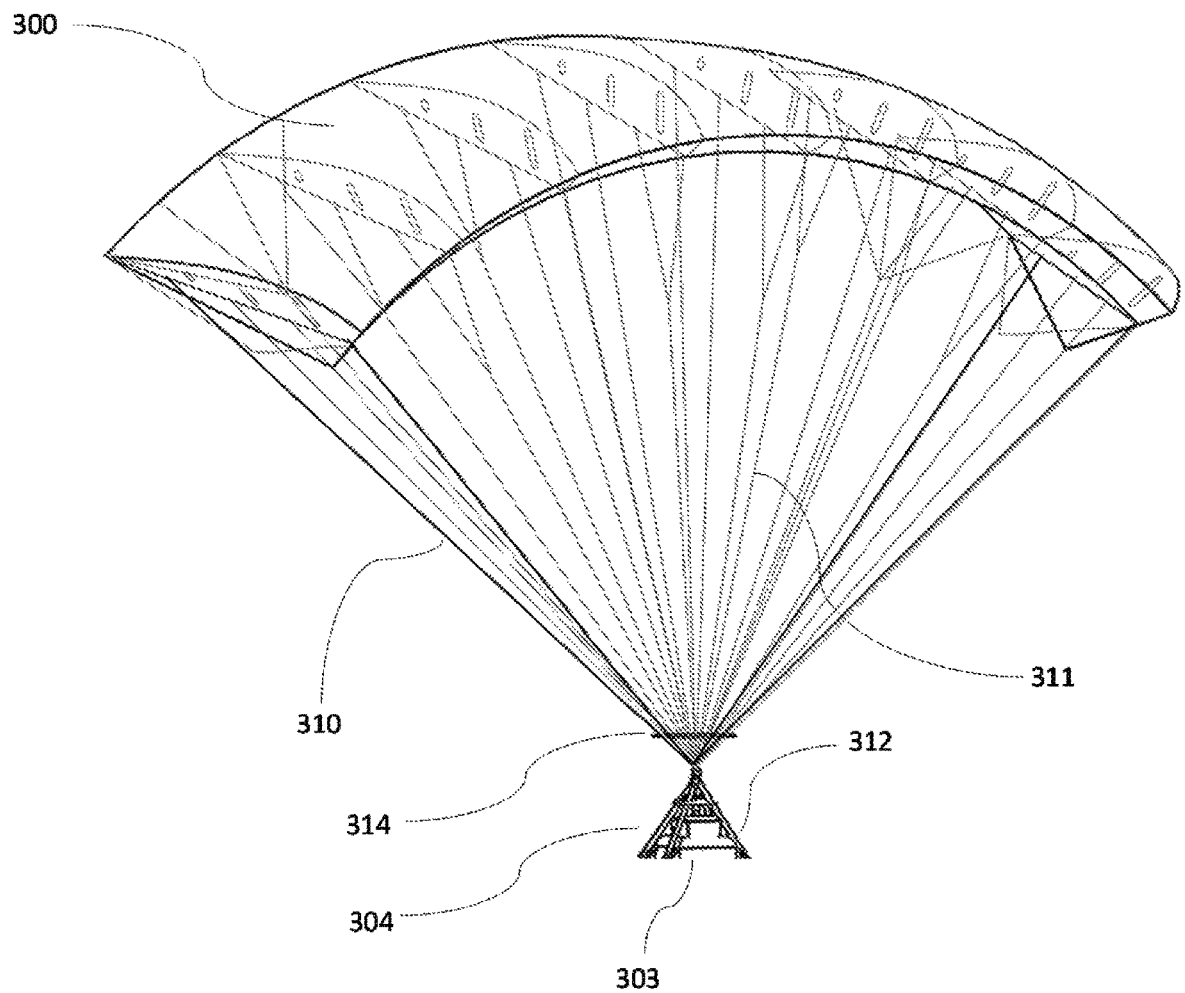
FIG. 11 shows a deployed parafoil in accordance with a third embodiment of the present invention.

The system is preferably released using a remote signal which activates a release mechanism that opens a deployment bag 309. Once released the system will begin to fall and the tensioned, rigidized suspension lines 310 pull the parafoil open, assisting in the parafoil deployment. Shortly after releasing a combination of the airflow and the rigidized suspension lines will open parafoil canopy 300 to a state where it is flying, as shown in FIG. 11. Rigidized lines 310 preferably act as ordinary suspension lines from this point forward. Non-rigidized suspension lines 311 are preferably unaffected by this process. Spreader plate 314 is preferably configured such that the lines are oriented correctly in flight. Structural base assembly 304 connects the parafoil suspension lines to the payload during the descent in the same fashion as during ascent. Payload risers 312 connect the payload to the suspension lines. This system may be coupled with traditional reserve parachute 303 for additional redundancy.

In any of the previous embodiments, once the wing tip supports (or rigidized lines) spring open and outward past vertical, the force of gravity can assist with them continuing to spread apart until the parafoil canopy is completely deployed.

Figure 14:
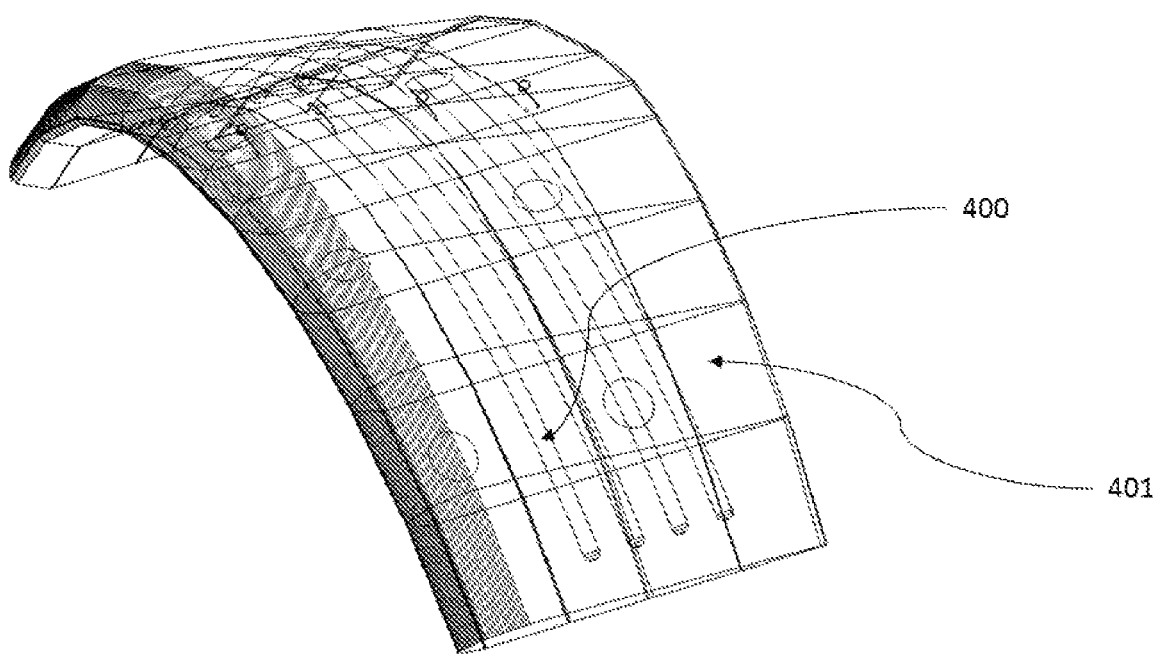
FIG. 14 shows an embodiment of a parafoil of the present invention comprising inflatable bladders or beams.

In a different embodiment of the invention, shown in FIG. 14, a series of inflatable bladders or beams 400 physically spread open parafoil canopy 401. The beams optionally inflate using compressed gas to a pressure sufficient to physically push the canopy fabric out to its fully extended width so that inflation in flight can happen very quickly and efficiently. The beams optionally utilize the existing parafoil cross-ports (holes in the structural and non-structural ribs of the parafoil) to allow the use of inflatable beams without significant modifications to the parafoil.

Figure 15:
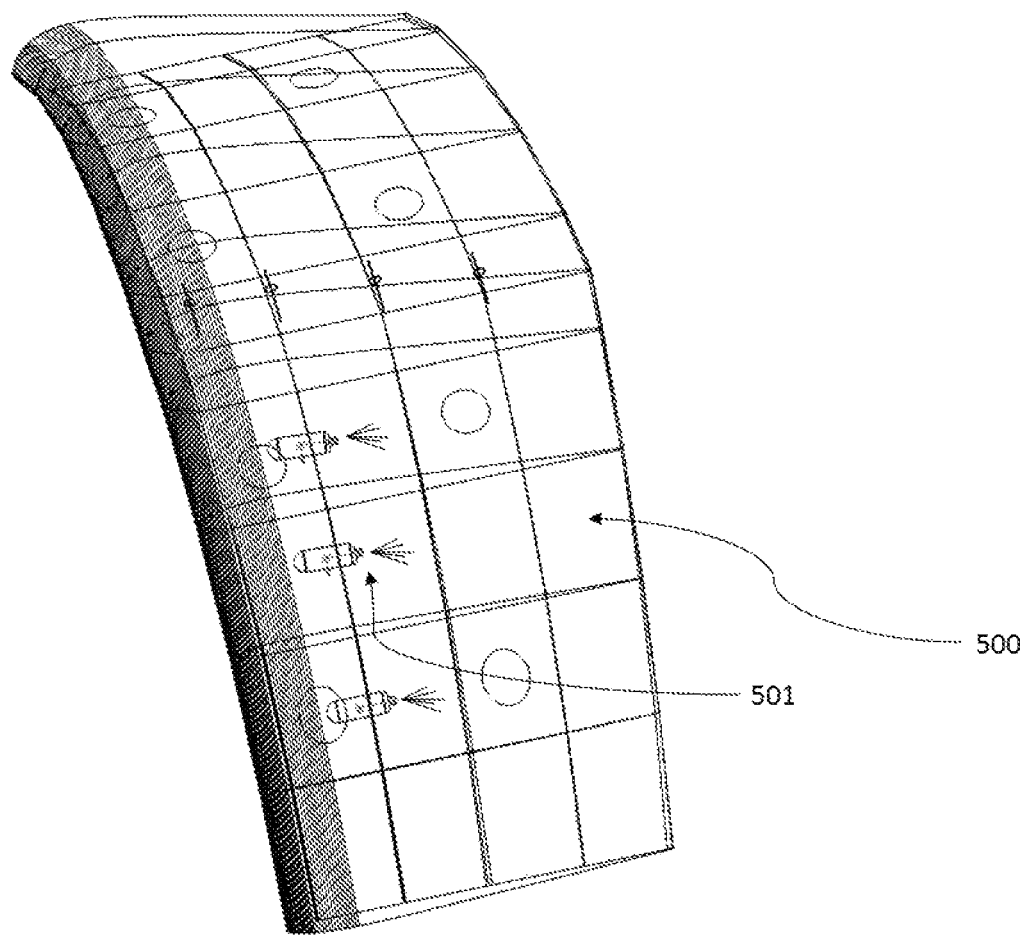
FIG. 15 shows an embodiment of a parafoil of the present invention utilizing compressed gas to directly inflate the canopy.

In another embodiment of the invention, shown in FIG. 15, compressed gas canisters 501, or alternatively a compressor, directly inflate canopy envelope 500. This process may optionally occur before, during or after the system's release from the balloon to establish the shape of the canopy before aerodynamic forces are high enough to cause the canopy to inflate by itself. Compressed air, for example, can be injected into the canopy interior providing the energy to push the canopy into an open state. Optional valved canopy inflation ports, such as fabric-flap type valves, may be used to allow flow into the cells but not out of them.

Figure 16:
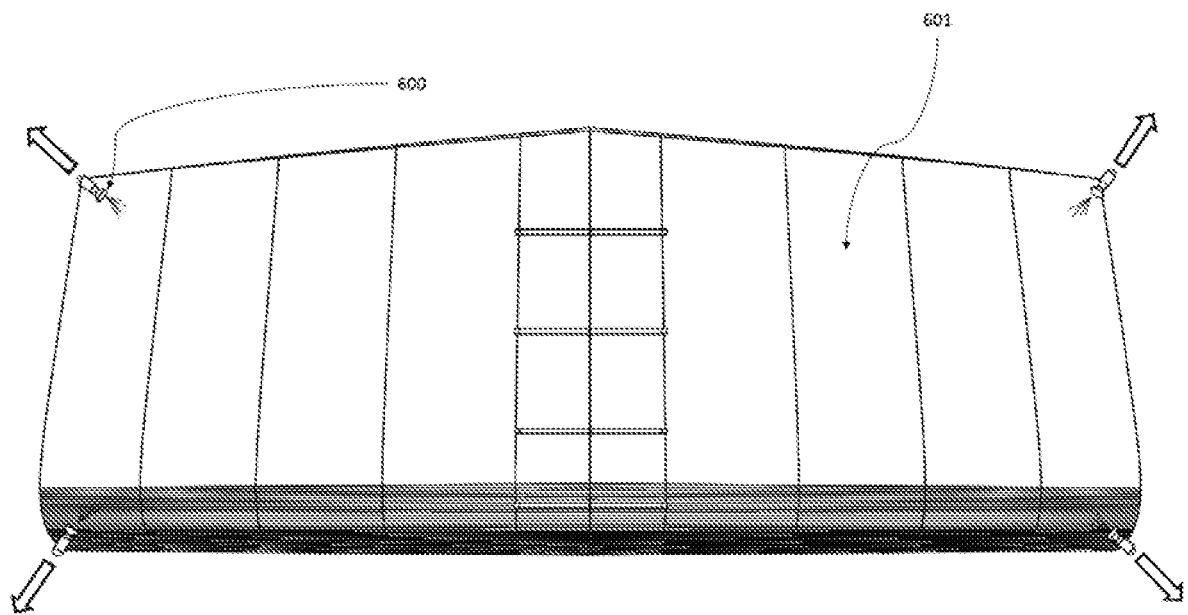
FIG. 16 shows an embodiment of a parafoil of the present invention comprising thrusters to help deploy the canopy.

In yet another embodiment of the invention, shown in FIG. 16, thrusters 600 are used to spread the canopy open during or immediately after release. Cold gas thrusters, chemical thrusters or any device capable of creating a linear force could be used to push canopy 601 into a deployed state.

Figure 17:
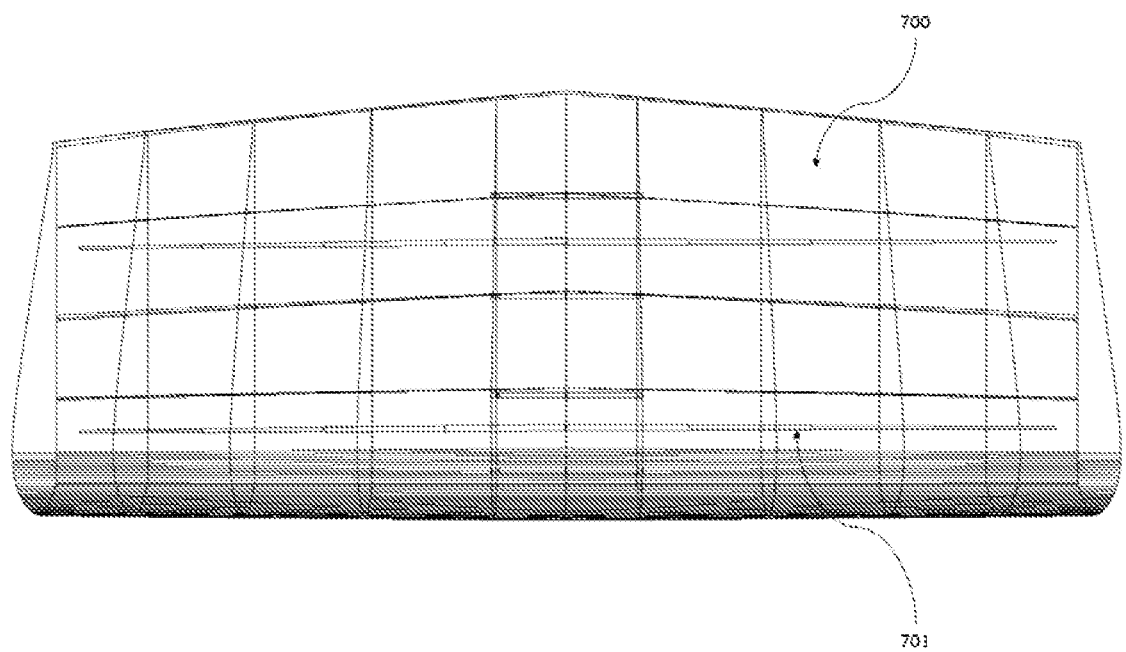
FIG. 17 shows an embodiment of a parafoil of the present invention comprising telescoping rods to help deploy the canopy.

In another embodiment of the invention, shown in FIG. 17, telescoping rods 701 push canopy 700 into a deployed state. The telescoping rods can be deployed using internal bladders, by compressed gas acting directly on the interior surface of the telescoping rod, or by any type of mechanical spring or stored energy device. The telescoping rods are preferably nested while the canopy is not being used, allowing it to be small. When actuated the rods preferably create a continuous member spanning some or all of the canopy width.

Figure 18:
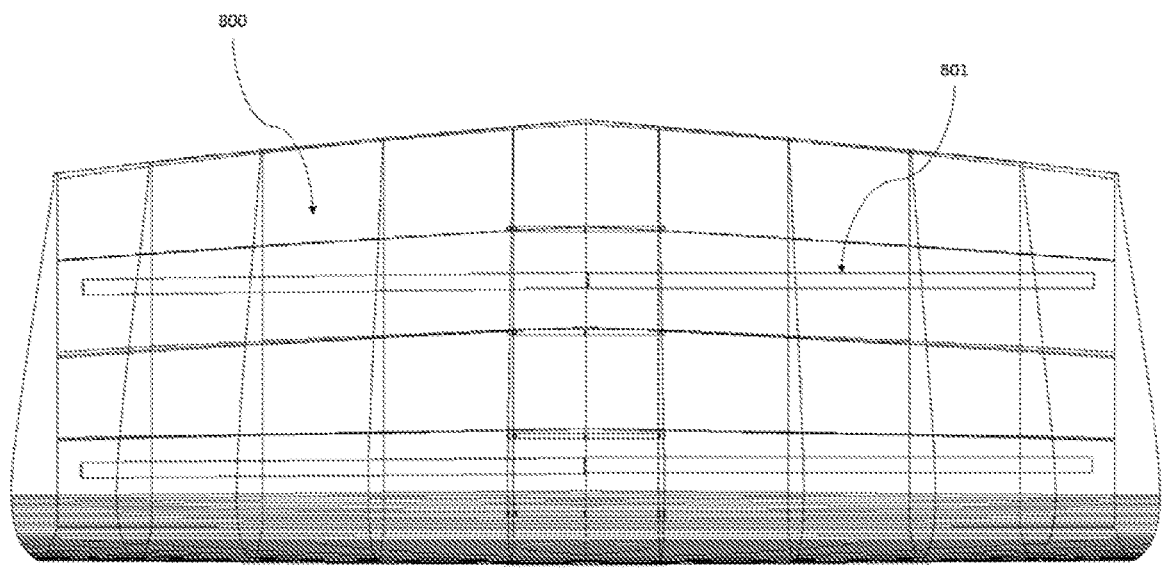
FIG. 18 shows an embodiment of a parafoil of the present invention comprising deployable beams to help deploy the canopy.

In a different embodiment of the invention, shown in FIG. 18, a parachute system employs deployable beams to spread out the parafoil fabric before, during or immediately after separation from a flight vehicle. Parafoil 800 can be stowed when not in use. When needed, deployable beam mechanism 801 deploys, thereby causing the parafoil to deploy. The deployable beam preferably comprises split-tube technology to allow a stowed, small beam to erect into a long rigid boom. The deployable beam optionally utilizes smart materials that change shape from a stowed condition to a rigid beam configuration when electricity, heat or both are applied. The rigid beams hold the canopy fabric open while the parafoil begins flying.

Figure 19:
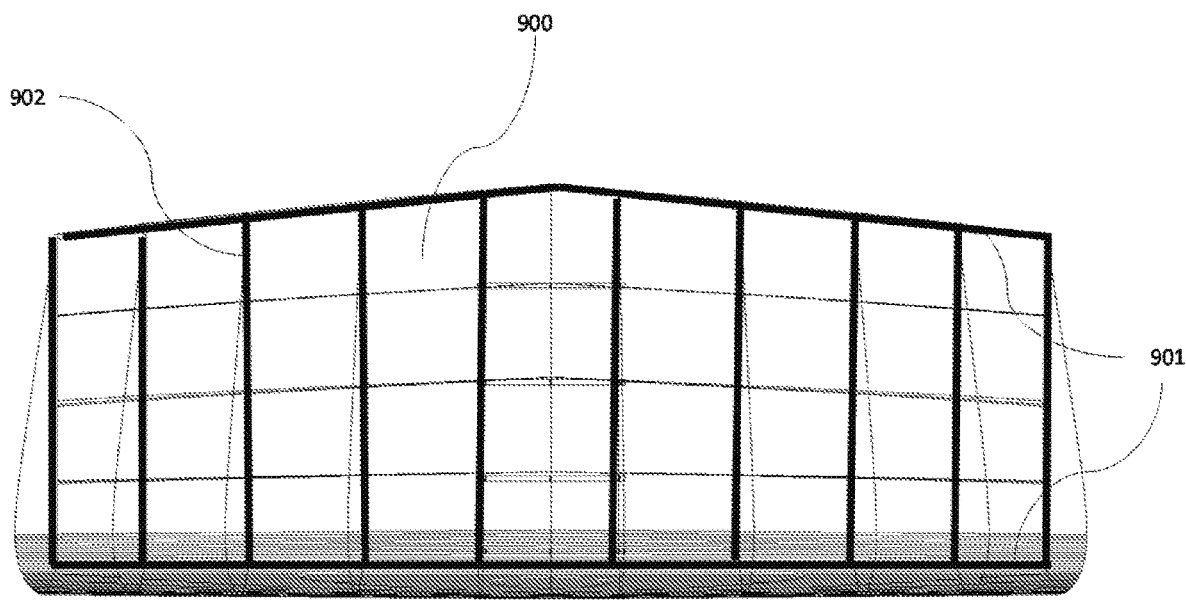
FIG. 19 shows an embodiment of a parafoil of the present invention comprising a lattice of rigid members.
Figure 20:
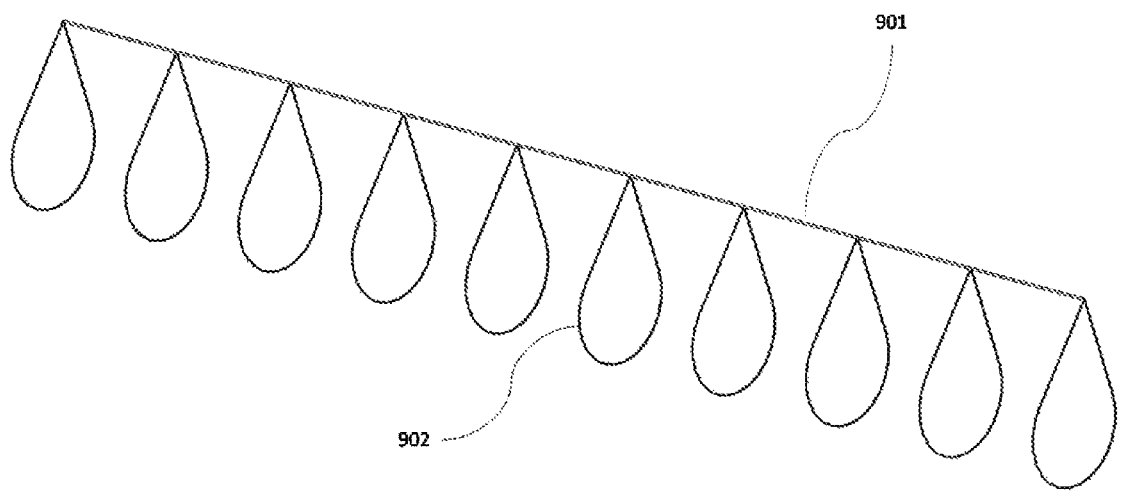
FIG. 20 shows the parafoil of FIG. 19 folded along its shortest dimension.
Figure 21:
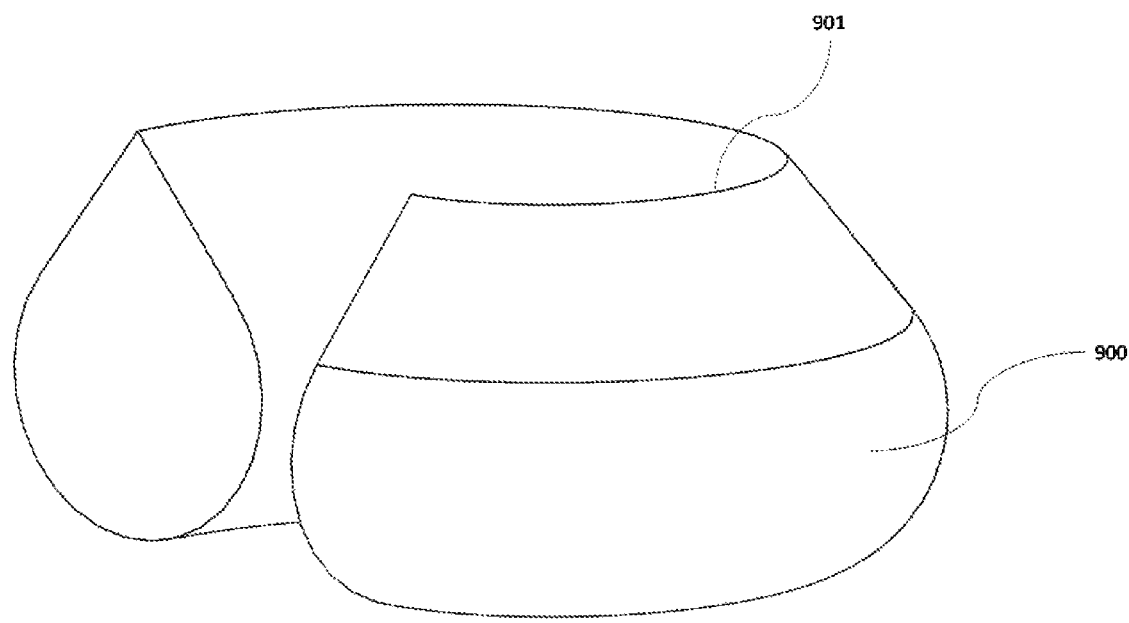
FIG. 21 shows the parafoil of FIG. 20 spiraled in the lengthwise dimension for stowage.

In another embodiment of the invention, shown in FIGS. 19, 20, and 21, a framework of rigidly flexible members 901, 902 make a rigidized lattice inside the canopy to keep its shape while the system is in a condition where it has little airspeed, is in low density air or both. In this embodiment of the invention, flexible spanwise members 901 run spanwise from wingtip to wingtip of canopy 900, and rigidly flexible cross members 902 run cordwise from nose to tail of canopy 900. To stow the canopy it is preferably first folded across its shortest dimension, connecting the nose of the canopy to the tail, such that cross members 902 make a partial tube shape or loop as shown in FIG. 20, while the two spanwise members 901 meet up in parallel and are not yet bent. The final stage in stowing the canopy is twisting spanwise members 901 into a spiral, as shown in FIG. 21, with canopy 900 spiraled along with the rigidizers. This system may be held in the stowed configuration using a closure loop. When ready to deploy the closure loop would be cut or otherwise opened, allowing the rigidizers to spring the canopy into the final flight configuration. In this embodiment the flexible members preferably comprise 0.156" diameter solid carbon fiber poles, although any material and size of pole, or hollow poles, may be used.

Although the invention has been described in detail with particular reference to the disclosed embodiments, other embodiments can achieve the same results. Variations and modifications of the present invention will be obvious to those skilled in the art and it is intended to cover all such modifications and equivalents. The entire disclosures of all patents and publications cited above are hereby incorporated by reference.

What is claimed is:

1. A high altitude parafoil comprising:
   a base structure configured to be attached with a payload and to be releasably attached to a high altitude balloon;
   a first elongated wing tip support hingedly connected with the base structure;
   a second elongated wing tip support hingedly connected with the base structure;
   a canopy connected to the first and second wing tip supports,
   wherein the first and second wing tip supports are configured to flex in a stowed configuration and to be released from the stowed configuration to spring open into a deployed flight configuration; and
   a plurality of suspension lines connecting the canopy to the base structure, wherein one or more of the plurality of suspension lines are configured to support the weight of the payload during flight of the high altitude balloon.

2. The high altitude parafoil of claim 1, wherein the first and second elongated wing tip supports are configured to rotate freely relative to the base structure when released from the stowed configuration.

3. The high altitude parafoil of claim 1, further comprising:
   a first hinge that couples a lower end of the first wing tip support with the base structure; and
   a second hinge that couples a lower end of the second wing tip support with the base structure,
   wherein the first wing tip support is configured to rotate about the first hinge as the first wing tip support springs open from the stowed configuration into the deployed flight configuration, and
   wherein the second wing tip support is configured to rotate about the second hinge as the second wing tip support springs open from the stowed configuration into the deployed flight configuration.

4. The high altitude parafoil of claim 1, wherein one or more other of the plurality of the suspension lines are configured to be slack during ascent and taut after the parafoil is released from the high altitude balloon.

5. The high altitude parafoil of claim 1, further comprising a ring coupled with an upper end of one or more of the one or more suspension lines, wherein the ring is configured to couple with a connection device for connecting the parafoil to the high altitude balloon located above the parafoil, and wherein the one or more of the one or more suspension lines is configured to transfer a load due to the payload to the high altitude balloon.

6. The high altitude parafoil of claim 1, further comprising:
   a release mechanism coupled with the base structure; and
   a tether releasably coupled with the base structure via the release mechanism,
   wherein, in the stowed configuration, the tether extends from the release mechanism and through the canopy and is configured to couple with a connection device for connection to the high altitude balloon located above the parafoil,
   and wherein release of the tether from the release mechanism will release the parafoil from the high altitude balloon.

7. The high altitude parafoil of claim 1, further comprising:
   a first plunger moveably coupled with an upper end of the first wing tip support; and
   a second plunger moveably coupled with an upper end of the second wing tip support,
   wherein the first plunger is configured to vary the position of the upper end of the first wing tip support along an axis defined by the first wing tip support in the deployed flight configuration, and
   wherein the second plunger is configured to vary the position of the upper end of the second wing tip support along an axis defined by the second wing tip support in the deployed flight configuration.

8. The high altitude parafoil of claim 1, further comprising a restraint configured to restrain the first and second wing tip supports in the stowed configuration.

9. The high altitude parafoil of claim 8, wherein the restraint is a closure loop configured to restrain the canopy and the first and second wing tip supports in the stowed configuration.

10. The high altitude parafoil of claim 1, further comprising:
    a first fulcrum coupled with the base structure near a lower end of the first wing tip support; and
    a second fulcrum coupled with the base structure near a lower end of the second wing tip support,
    wherein the first and second fulcrums are configured to fix the lower ends of the first and second wing tip supports, respectively, at an initial angle in the stowed configuration.

11. The high altitude parafoil of claim 10, wherein the initial angle is approximately 22 degrees.

12. The high altitude parafoil of claim 1, further comprising:
    a third elongated wing tip support connected to the canopy and hingedly connected with the base structure;
    a fourth elongated wing tip support connected to the canopy and hingedly connected with the base structure;
    a fifth elongated wing tip support connected to the canopy and hingedly connected with the base structure; and a sixth elongated wing tip support connected to the canopy and hingedly connected with the base structure, wherein the third, fourth, fifth, and sixth wing tip supports are configured to flex in the stowed configuration and to be released from the stowed configuration to spring open into the deployed flight configuration.

13. The high altitude parafoil of claim 12, wherein the canopy further comprises:

a nose extending between first and second ends of the canopy and coupled with an upper end of the fifth wing tip support; and a tail extending between the first and second ends of the canopy, the tail located opposite the nose and coupled with an upper end of the sixth wing tip support, wherein the first end of the canopy is further coupled with an upper end of the third wing tip support, and the second end of the canopy is further coupled with an upper end of the fourth wing tip support.

14. A high altitude parafoil for supporting a payload and releasably attaching to a flight vehicle, the high altitude parafoil comprising:

a base structure configured to be attached with the payload;

a first elongated wing tip support rotatably connected with the base structure;

a second elongated wing tip support rotatably connected with the base structure;

a canopy connected to the first and second wing tip supports, wherein the first and second wing tip supports are configured to flex in a restrained stowed configuration and to be released from the stowed configuration to rotate and straighten out into a deployed flight configuration to spread open the canopy;

a plurality of suspension lines connecting the canopy to the base structure, wherein one or more of the plurality of suspension lines are configured to support the weight of the payload during flight of the flight vehicle; and a tether coupled with the parafoil and configured to couple to the flight vehicle, wherein releasing the tether will release the parafoil from the flight vehicle.

15. The high altitude parafoil of claim 14, wherein the tether is coupled with the base structure.

16. The high altitude parafoil of claim 14, wherein the tether is configured to release from the parafoil.

17. The high altitude parafoil of claim 14, wherein the flight vehicle comprises a high altitude balloon.

* * * * *